United States Patent
Kruse et al.

(10) Patent No.: US 10,630,781 B2
(45) Date of Patent: Apr. 21, 2020

(54) SMB2 SCALEOUT

(71) Applicant: Microsoft Technology Licensing, LLC, Redmond, WA (US)

(72) Inventors: David M. Kruse, Kirkland, WA (US); Daniel E. Lovinger, Seattle, WA (US); Thomas E. Jolly, Redmond, WA (US); James T. Pinkerton, Sammamish, WA (US); Mathew George, Bellevue, WA (US); Roopesh C. Battepati, Sammamish, WA (US); Mingdong Shang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/834,959

(22) Filed: Aug. 25, 2015

(65) Prior Publication Data

US 2015/0365482 A1  Dec. 17, 2015

Related U.S. Application Data

(62) Division of application No. 13/228,818, filed on Sep. 9, 2011, now abandoned.

(51) Int. Cl.
*H04L 29/08* (2006.01)
*H04L 29/06* (2006.01)

(52) U.S. Cl.
CPC ............ *H04L 67/141* (2013.01); *H04L 67/10* (2013.01); *H04L 67/1014* (2013.01);
(Continued)

(58) Field of Classification Search
CPC ......... G06F 17/30067; G06F 17/30197; H04L 67/141; H04L 67/1097; H04L 67/10; H04L 67/148; H04L 67/1038; H04L 69/14
See application file for complete search history.

(56) References Cited

U.S. PATENT DOCUMENTS

| 4,399,504 A | 8/1983 | Obermarck |
| 4,780,821 A | 10/1988 | Crossley |

(Continued)

FOREIGN PATENT DOCUMENTS

| CN | 1155119 A | 7/1997 |
| CN | 1299484 A | 6/2001 |

(Continued)

OTHER PUBLICATIONS

Aboba et al., Extensible Authentication Protocol (EAP) [online], See Fast Connect, RFC 3748, Jun. 2004, [Retrieved Mar. 3, 2007], Retrieved from: http://www.ietf.org/rfc/rfc3748.txt?number=3748.

(Continued)

*Primary Examiner* — Moustafa M Meky
*Assistant Examiner* — Kidest Mendaye

(57) ABSTRACT

Systems and methods are disclosed for clients and servers operating in a scaled cluster environment. Efficiencies are introduced to the process of connecting a client to a clustered environment by providing the client with the ability to attempt a connection with multiple servers in parallel. Servers operating the in the clustered environment are also capable of providing persistent storage of file handles and other state information. Ownership of the state information and persistent handles may be transferred between servers, thereby providing clients with the opportunity to move from one server to another while maintaining access to resources in the clustered environment.

20 Claims, 6 Drawing Sheets

(52) U.S. Cl.
CPC ...... *H04L 67/1038* (2013.01); *H04L 67/1097* (2013.01); *H04L 67/148* (2013.01); *H04L 69/14* (2013.01)

(56) References Cited

U.S. PATENT DOCUMENTS

| | | | |
|---|---|---|---|
| 4,791,566 A | 12/1988 | Sudama | |
| 4,825,354 A | 4/1989 | Agrawal | |
| 4,887,204 A | 12/1989 | Johnson | |
| 4,891,785 A | 1/1990 | Donohoo | |
| 4,914,570 A | 4/1990 | Peacock | |
| 5,008,853 A | 4/1991 | Bly | |
| 5,109,519 A | 4/1992 | Zimmet | |
| 5,113,519 A | 5/1992 | Johnson | |
| 5,202,971 A | 4/1993 | Henson | |
| 5,218,696 A | 6/1993 | Baird et al. | |
| 5,261,051 A | 11/1993 | Masden et al. | |
| 5,265,261 A | 11/1993 | Rubin et al. | |
| 5,313,646 A | 5/1994 | Hendricks et al. | |
| 5,349,642 A | 9/1994 | Kingdon | |
| 5,375,207 A | 12/1994 | Blakely et al. | |
| 5,410,697 A | 4/1995 | Baird | |
| 5,437,013 A | 7/1995 | Rubin et al. | |
| 5,452,447 A | 9/1995 | Nelson | |
| 5,491,752 A | 2/1996 | Kaufman et al. | |
| 5,493,728 A | 2/1996 | Solton | |
| 5,513,314 A | 4/1996 | Kandasamy | |
| 5,522,042 A | 5/1996 | Fee et al. | |
| 5,535,375 A | 7/1996 | Eshel et al. | |
| 5,560,008 A | 9/1996 | Johnson et al. | |
| 5,588,117 A | 12/1996 | Karp et al. | |
| 5,628,005 A | 5/1997 | Hurvig | |
| 5,764,887 A | 6/1998 | Kells et al. | |
| 5,826,027 A | 10/1998 | Pedersen et al. | |
| 5,931,913 A | 8/1999 | Meriwether et al. | |
| 5,933,602 A | 8/1999 | Grover | |
| 5,978,802 A | 11/1999 | Hurvig | |
| 5,987,621 A | 11/1999 | Duso et al. | |
| 6,085,247 A | 7/2000 | Parsons et al. | |
| 6,092,199 A | 7/2000 | Dutcher | |
| 6,125,122 A | 9/2000 | Favichia et al. | |
| 6,131,125 A | 10/2000 | Rostoker et al. | |
| 6,208,952 B1 | 3/2001 | Goertzel | |
| 6,219,799 B1 | 4/2001 | Kandasamy | |
| 6,243,862 B1 | 6/2001 | Lebow | |
| 6,247,139 B1 | 6/2001 | Walker et al. | |
| 6,275,953 B1 | 8/2001 | Vahalia et al. | |
| 6,317,844 B1 | 11/2001 | Kleiman | |
| 6,324,581 B1 | 11/2001 | Xu et al. | |
| 6,347,337 B1 | 2/2002 | Shah et al. | |
| 6,349,250 B1 | 2/2002 | Hart et al. | |
| 6,349,350 B1 | 2/2002 | Hathorn et al. | |
| 6,401,123 B1 | 6/2002 | Shields et al. | |
| 6,430,691 B1 | 8/2002 | Di Santo et al. | |
| 6,438,691 B1 | 8/2002 | Mao | |
| 6,452,903 B1 | 9/2002 | Peck et al. | |
| 6,453,354 B1 | 9/2002 | Jiang et al. | |
| 6,640,226 B1 | 10/2003 | Shringeri et al. | |
| 6,658,476 B1 | 12/2003 | Van | |
| 6,732,289 B1 | 5/2004 | Talagala et al. | |
| 6,829,473 B2 | 12/2004 | Raman et al. | |
| 6,883,015 B1 | 4/2005 | Geen et al. | |
| 6,910,082 B1 | 6/2005 | Marcotte | |
| 6,928,577 B2 | 8/2005 | Moser et al. | |
| 7,020,651 B2 | 3/2006 | Ripley | |
| 7,050,984 B1 | 5/2006 | Kerpelman | |
| 7,103,007 B2 | 9/2006 | Natarajan et al. | |
| 7,111,035 B2 | 9/2006 | McClellan et al. | |
| 7,111,060 B2 | 9/2006 | Araujo et al. | |
| 7,197,535 B2 | 3/2007 | Salesky et al. | |
| 7,243,132 B2 | 7/2007 | Choi | |
| 7,290,141 B2 | 10/2007 | Sengodan et al. | |
| 7,293,192 B2 | 11/2007 | Allen et al. | |
| 7,318,102 B1 | 1/2008 | Krause et al. | |
| 7,330,910 B2 | 2/2008 | Young et al. | |
| 7,339,885 B2 | 3/2008 | Ahrens et al. | |
| 7,380,080 B2 | 5/2008 | Hughes | |
| 7,380,155 B2 | 5/2008 | Fung et al. | |
| 7,383,463 B2 | 6/2008 | Hayden et al. | |
| 7,386,889 B2 | 6/2008 | Shay | |
| 7,388,866 B2 | 6/2008 | Fan et al. | |
| 7,409,420 B2 | 8/2008 | Pullara et al. | |
| 7,421,502 B2 | 9/2008 | Czap et al. | |
| 7,434,087 B1 | 10/2008 | Singh | |
| 7,444,536 B1 | 10/2008 | Jairath | |
| 7,451,221 B2 | 11/2008 | Basani et al. | |
| 7,453,879 B1 | 11/2008 | Lo | |
| 7,457,722 B1 | 11/2008 | Shain et al. | |
| 7,475,142 B2 | 1/2009 | Sharma et al. | |
| 7,509,407 B2 | 3/2009 | Miller et al. | |
| 7,526,658 B1 | 4/2009 | He et al. | |
| 7,526,668 B2 | 4/2009 | Shitomi et al. | |
| 7,539,722 B2 | 5/2009 | Mohamed et al. | |
| 7,562,129 B1 | 7/2009 | Lee et al. | |
| 7,664,991 B1 | 2/2010 | Gunda et al. | |
| 7,673,066 B2 | 3/2010 | Zheng | |
| 7,702,745 B2 | 4/2010 | Lin et al. | |
| 7,730,489 B1 | 6/2010 | Duvur et al. | |
| 7,774,544 B1 | 8/2010 | Watanabe et al. | |
| 7,962,129 B2 | 6/2011 | Small et al. | |
| 8,271,996 B1* | 9/2012 | Gould | G06F 9/542 719/312 |
| 8,275,815 B2 | 9/2012 | Aronovich et al. | |
| 8,316,129 B2 | 11/2012 | Kruse et al. | |
| 8,332,526 B2 | 12/2012 | Kruse et al. | |
| 8,631,277 B2 | 1/2014 | Swan et al. | |
| 8,751,533 B1* | 6/2014 | Dhavale | G06F 3/0647 707/782 |
| 8,788,579 B2 | 7/2014 | Kruse et al. | |
| 8,825,885 B2 | 9/2014 | Kruse et al. | |
| 8,850,025 B2 | 9/2014 | Kruse et al. | |
| 8,856,582 B2 | 10/2014 | George et al. | |
| 9,071,661 B2 | 6/2015 | Kruse et al. | |
| 9,331,955 B2 | 5/2016 | Talpey et al. | |
| 9,332,089 B2 | 5/2016 | Kruse et al. | |
| 9,438,696 B2 | 9/2016 | Kruse et al. | |
| 9,462,039 B2 | 10/2016 | George et al. | |
| 2002/0019874 A1 | 2/2002 | Borr | |
| 2002/0024963 A1 | 2/2002 | Reeve | |
| 2002/0062379 A1 | 5/2002 | Widegren | |
| 2002/0073211 A1* | 6/2002 | Lin | H04L 63/10 709/229 |
| 2002/0083130 A1 | 6/2002 | Shimada et al. | |
| 2002/0152315 A1 | 10/2002 | Kagan et al. | |
| 2002/0161980 A1 | 10/2002 | Nishikawa | |
| 2003/0014480 A1 | 1/2003 | Pullara et al. | |
| 2003/0018927 A1 | 1/2003 | Gadir et al. | |
| 2003/0056069 A1 | 3/2003 | Cabrera et al. | |
| 2003/0058277 A1 | 3/2003 | Bowman-Amuah | |
| 2003/0093643 A1 | 5/2003 | Britt, Jr. | |
| 2003/0093678 A1 | 5/2003 | Bowe et al. | |
| 2003/0112754 A1 | 6/2003 | Ramani et al. | |
| 2003/0115341 A1 | 6/2003 | Sinha et al. | |
| 2003/0126195 A1 | 7/2003 | Reynolds et al. | |
| 2003/0140129 A1 | 7/2003 | Livnat et al. | |
| 2003/0169859 A1 | 9/2003 | Strathmeyer et al. | |
| 2003/0182282 A1 | 9/2003 | Ripley | |
| 2004/0003210 A1 | 1/2004 | Duale et al. | |
| 2004/0003241 A1 | 1/2004 | Sengodan et al. | |
| 2004/0018829 A1 | 1/2004 | Raman et al. | |
| 2004/0019660 A1 | 1/2004 | E et al. | |
| 2004/0032876 A1 | 2/2004 | Garg et al. | |
| 2004/0044930 A1 | 3/2004 | Keller et al. | |
| 2004/0103342 A1 | 5/2004 | Moser et al. | |
| 2004/0111527 A1 | 6/2004 | Czap, Jr. et al. | |
| 2004/0136325 A1 | 7/2004 | Dobric et al. | |
| 2004/0160909 A1 | 8/2004 | Sheynblat | |
| 2004/0215794 A1 | 10/2004 | Lauer | |
| 2004/0225952 A1 | 11/2004 | Brown et al. | |
| 2004/0255202 A1 | 12/2004 | Wong | |
| 2004/0260748 A1 | 12/2004 | Springer et al. | |
| 2004/0267932 A1 | 12/2004 | Voellm et al. | |
| 2004/0267935 A1 | 12/2004 | Patiejunas | |
| 2004/0268118 A1 | 12/2004 | Bazan Bejarano | |

(56) References Cited

U.S. PATENT DOCUMENTS

| | | |
|---|---|---|
| 2005/0010670 A1 | 1/2005 | Greschler et al. |
| 2005/0015511 A1 | 1/2005 | Izmailov et al. |
| 2005/0015747 A1 | 1/2005 | Zatloukal et al. |
| 2005/0021832 A1 | 1/2005 | Bennett et al. |
| 2005/0038828 A1 | 2/2005 | Kaluskar et al. |
| 2005/0041686 A1 | 2/2005 | Roy et al. |
| 2005/0055345 A1 | 3/2005 | Ripley |
| 2005/0060442 A1 | 3/2005 | Beverly et al. |
| 2005/0091212 A1* | 4/2005 | Mohamed ......... G06F 17/30067 |
| 2005/0102537 A1 | 5/2005 | Zheng |
| 2005/0111030 A1 | 5/2005 | Berkema et al. |
| 2005/0114670 A1 | 5/2005 | Bowe et al. |
| 2005/0125378 A1 | 6/2005 | Kawada |
| 2005/0129045 A1 | 6/2005 | Machulsky et al. |
| 2005/0131832 A1 | 6/2005 | Fransdonk |
| 2005/0132077 A1 | 6/2005 | Biran et al. |
| 2005/0138528 A1 | 6/2005 | Ameigeiras et al. |
| 2005/0149817 A1 | 7/2005 | Biran et al. |
| 2005/0177635 A1 | 8/2005 | Schmidt et al. |
| 2005/0182850 A1 | 8/2005 | Kohno |
| 2005/0198113 A1 | 9/2005 | Mohamed et al. |
| 2005/0198247 A1 | 9/2005 | Perry et al. |
| 2005/0198359 A1 | 9/2005 | Basani et al. |
| 2005/0198380 A1 | 9/2005 | Panasyuk et al. |
| 2005/0223014 A1* | 10/2005 | Sharma ............. G06F 17/30197 |
| 2005/0228884 A1 | 10/2005 | Hawley |
| 2005/0246803 A1 | 11/2005 | Spencer |
| 2005/0248803 A1 | 11/2005 | Ohara |
| 2005/0251448 A1 | 11/2005 | Gropper |
| 2005/0257022 A1 | 11/2005 | Hughes |
| 2005/0258022 A1 | 11/2005 | Horton et al. |
| 2005/0262084 A1 | 11/2005 | Tomita |
| 2005/0262103 A1 | 11/2005 | Stakutis et al. |
| 2005/0273592 A1 | 12/2005 | Pryor |
| 2006/0031519 A1 | 2/2006 | Helliwell et al. |
| 2006/0036744 A1 | 2/2006 | Andrus et al. |
| 2006/0041698 A1 | 2/2006 | Han et al. |
| 2006/0045005 A1 | 3/2006 | Blackmore et al. |
| 2006/0047818 A1 | 3/2006 | Kruglick et al. |
| 2006/0059118 A1 | 3/2006 | Byrd et al. |
| 2006/0080443 A1 | 4/2006 | Kruglick et al. |
| 2006/0080568 A1 | 4/2006 | Subbaraman et al. |
| 2006/0085328 A1 | 4/2006 | Cohen et al. |
| 2006/0095382 A1 | 5/2006 | Mahlbacher |
| 2006/0130107 A1 | 6/2006 | Gonder et al. |
| 2006/0168262 A1 | 7/2006 | Frazer |
| 2006/0206705 A1 | 9/2006 | Khosravi |
| 2006/0224764 A1 | 10/2006 | Shinohara et al. |
| 2006/0271679 A1 | 11/2006 | Mousseau et al. |
| 2006/0271692 A1 | 11/2006 | Kruse et al. |
| 2006/0271697 A1 | 11/2006 | Kruse et al. |
| 2006/0281525 A1 | 12/2006 | Borissov |
| 2007/0150558 A1 | 6/2007 | Teodosiu et al. |
| 2007/0150602 A1* | 6/2007 | Yared ................... H04L 67/1008 |
| | | 709/227 |
| 2007/0171793 A1 | 7/2007 | Mesut et al. |
| 2007/0192326 A1* | 8/2007 | Angal ................. G06F 11/1482 |
| 2007/0220155 A1* | 9/2007 | Nalla .................... H04L 67/141 |
| | | 709/227 |
| 2008/0010485 A1 | 1/2008 | Shitomi et al. |
| 2008/0126704 A1 | 5/2008 | Ulrich et al. |
| 2008/0140663 A1* | 6/2008 | Jones ................... G06F 16/1774 |
| 2008/0151885 A1 | 6/2008 | Horn et al. |
| 2008/0172397 A1 | 7/2008 | Maeda et al. |
| 2008/0256231 A1 | 10/2008 | Burnett et al. |
| 2008/0301311 A1 | 12/2008 | Bestler |
| 2009/0030986 A1* | 1/2009 | Bates .................... G06F 3/0607 |
| | | 709/205 |
| 2009/0077097 A1 | 3/2009 | Lacapra et al. |
| 2009/0113050 A1* | 4/2009 | Hatanaka ................ H04L 29/06 |
| | | 709/224 |
| 2009/0138615 A1 | 5/2009 | Cristallo et al. |
| 2009/0172085 A1 | 7/2009 | Arthursson |
| 2009/0183005 A1 | 7/2009 | Kawell et al. |
| 2009/0222582 A1 | 9/2009 | Josefsberg et al. |
| 2009/0319661 A1 | 12/2009 | Shiozawa et al. |
| 2009/0327798 A1* | 12/2009 | D'Amato ................ G06F 3/062 |
| | | 714/4.1 |
| 2010/0042715 A1 | 2/2010 | Tham et al. |
| 2010/0161855 A1 | 6/2010 | Mohamed et al. |
| 2010/0185704 A1 | 7/2010 | George et al. |
| 2011/0040826 A1 | 2/2011 | Chadzelek et al. |
| 2011/0131334 A1 | 6/2011 | Takasu |
| 2012/0144019 A1 | 6/2012 | Zhu et al. |
| 2012/0151249 A1 | 6/2012 | Swan et al. |
| 2013/0007180 A1 | 1/2013 | Talpey et al. |
| 2013/0007518 A1 | 1/2013 | George et al. |
| 2013/0066941 A1 | 3/2013 | Kruse et al. |
| 2013/0067095 A1 | 3/2013 | Kruse et al. |
| 2013/0091199 A1 | 4/2013 | Kruse et al. |
| 2013/0097211 A1 | 4/2013 | Kruse et al. |
| 2013/0228732 A1 | 9/2013 | Robinson et al. |
| 2013/0304932 A1 | 11/2013 | Kruse et al. |
| 2014/0304409 A1* | 10/2014 | Kamath ............... H04L 67/1036 |
| | | 709/225 |
| 2014/0372521 A1 | 12/2014 | George et al. |
| 2015/0026248 A1 | 1/2015 | Kruse et al. |
| 2015/0281404 A1 | 10/2015 | Kruse et al. |
| 2016/0226951 A1 | 8/2016 | Talpey et al. |

FOREIGN PATENT DOCUMENTS

| | | |
|---|---|---|
| CN | 1758608 A | 4/2006 |
| CN | 1767472 A | 5/2006 |
| CN | 1870642 A | 11/2006 |
| CN | 1882933 | 12/2006 |
| CN | 1906593 A | 1/2007 |
| CN | 1937532 A | 3/2007 |
| CN | 101207635 A | 6/2008 |
| CN | 101217483 A | 7/2008 |
| CN | 101375263 A | 2/2009 |
| CN | 101535978 A | 9/2009 |
| CN | 101594320 | 12/2009 |
| CN | 101605194 A | 12/2009 |
| CN | 101926155 | 12/2010 |
| EP | 1 259 045 A2 | 11/2002 |
| EP | 1 259 045 A3 | 11/2002 |
| EP | 1643406 A2 | 4/2006 |
| EP | 1669850 | 6/2006 |
| EP | 1 727 056 | 11/2006 |
| EP | 2727287 | 5/2014 |
| JP | 60-019341 | 1/1985 |
| JP | 62-297927 | 12/1987 |
| JP | 63-061148 | 3/1988 |
| JP | 63-205747 | 8/1988 |
| JP | 63-256165 | 10/1988 |
| JP | 64-061148 | 3/1989 |
| JP | 02-101847 | 4/1990 |
| JP | 03-048558 | 3/1991 |
| JP | 03-074745 | 3/1991 |
| JP | H03245939 A | 11/1991 |
| JP | 04-172039 | 6/1992 |
| JP | 04-229746 | 8/1992 |
| JP | 05-089048 | 4/1993 |
| JP | 05-143488 | 6/1993 |
| JP | 06-075890 | 3/1994 |
| JP | 06-342382 A | 12/1994 |
| JP | H-07-036760 A | 2/1995 |
| JP | Hei 08-314784 | 11/1996 |
| JP | 1998-013397 | 1/1998 |
| JP | H10-133971 | 5/1998 |
| JP | 10-313342 | 11/1998 |
| JP | H11-015786 | 1/1999 |
| JP | 11-055314 | 2/1999 |
| JP | 11-265361 A | 9/1999 |
| JP | 2000-066922 A | 3/2000 |
| JP | 2000163369 A | 6/2000 |
| JP | 2001-077844 | 3/2001 |
| JP | 2001-094613 | 4/2001 |
| JP | 2003-016766 | 1/2003 |
| JP | 2003032727 A | 1/2003 |
| JP | 2003-504699 | 2/2003 |
| JP | 2003-069610 | 3/2003 |
| JP | 2003-281091 | 3/2003 |

(56) References Cited

FOREIGN PATENT DOCUMENTS

| | | |
|---|---|---|
| JP | 2003-125022 | 4/2003 |
| JP | 2003-196178 A | 7/2003 |
| JP | 2003-337717 | 11/2003 |
| JP | 2004-005427 | 1/2004 |
| JP | 2004-078949 | 3/2004 |
| JP | 2004139385 A | 5/2004 |
| JP | 2004-227566 | 8/2004 |
| JP | 2004-229143 | 8/2004 |
| JP | 2005-032172 | 2/2005 |
| JP | 2005-517241 | 6/2005 |
| JP | 2005-322016 | 11/2005 |
| JP | 2006-079603 | 3/2006 |
| JP | 2006-113735 | 4/2006 |
| JP | 2006-191617 | 7/2006 |
| JP | 2006-333433 | 12/2006 |
| JP | 2006-333434 | 12/2006 |
| JP | 2007-49755 | 2/2007 |
| JP | 2007-058506 | 3/2007 |
| JP | 3967758 | 6/2007 |
| JP | 2010009090 A | 1/2010 |
| KR | 10-1994-0001700 | 3/1994 |
| KR | 100272567 B1 | 11/2000 |
| KR | 10-0860152 | 9/2008 |
| RU | 2118051 C1 | 8/1998 |
| RU | 2313824 C2 | 12/2007 |
| RU | 2365983 C2 | 8/2009 |
| RU | 2368944 C2 | 9/2009 |
| RU | 2380749 C2 | 1/2010 |
| WO | WO 2001/077844 | 10/2001 |
| WO | 03/096646 | 11/2003 |
| WO | 03105439 | 12/2003 |
| WO | 2004-003765 | 1/2004 |
| WO | WO 2004/003765 | 1/2004 |
| WO | 2005048025 A2 | 5/2005 |
| WO | 2013036697 A2 | 3/2013 |

OTHER PUBLICATIONS

Almeida, "FIFS: A Framework for Implementing User-Mode File Systems in Windows NT", Proceedings of the 3rd USENIX Windows NT Symposium, Jul. 12-15, 1999, 19 pgs.
Alvisi et al., "Low-Overhead Protocols for Fault-Tolerant File Sharing"; In Proceedings of the IEEE 18th International Conference on Distributed Computing Systems; 1998; 10 pgs.
Ansi, Financial Institution Message Authentication (Wholesale), Financial Services Technical Publication, ANSI X9.9-1994, Aug. 15, 1986; 38 pgs.
Asokan et al., Server Supported Signatures, Journal of Computer Security, Fall 1997; 13 pgs.
Bell Labs, Plan 9 default Fossil File System [online], [Retrieved Sep. 17, 2007], Retrieved from: http://plan9.bell-labs.com/magic/man2html/4/fossil; 4 pgs.
Bensaou et al., Credit-Based Fair Queueing (CBFQ): A Simple Service-Scheduling Algorithm for Packet-Switched Networks, IEEE/ACM Transactions on Networking, vol. 9, No. 5, Oct. 2001.
Chinese 1st Office Action and Search Report Issued in Chinese Patent Application No. 201280032558.7, dated Aug. 5, 2015, 19 Pages.
Chinese 1st Office Action in Application 201110329007.4, dated Oct. 10, 2013, 13 pgs.
Chinese 1st Office Action in Application 201110462797.3, dated Apr. 16, 2014, 11 pgs.
Chinese 1st Office Action in Application 201210330725.8, dated Oct. 10, 2014, 11 pgs.
Chinese 1st Office Action in Application 201210331041.X, dated Sep. 3, 2014, 14 pgs.
Chinese 1st Office Action in Application 201210434813.2, dated Nov. 3, 2014, 10 pgs.
Chinese 2nd Office Action in Application 201110329007.4, dated Jun. 12, 2014, 8 pgs.
Chinese 2nd Office Action in Application 201110462797.3, dated Sep. 24, 2014, 6 pgs.
Chinese 2nd Office Action in Application 201210330725.8, dated Jul. 1, 2015, 7 pgs.
Chinese 2nd Office Action in Application 201210331041.X, dated Mar. 9, 2015, 10 pgs.
Chinese 2nd Office Action in Application 201210434813.2, dated Jun. 30, 2015, 7 pgs.
Chinese 3rd Office Action in Application 201110329007.4, dated Dec. 29, 2014, 6 pgs.
Chinese 3rd Office Action in Application 201210331041.X, dated Aug. 18, 2015, 7 pgs.
Chinese 4th Office Action in Application 200510127998.2, dated Nov. 16, 2011, 7 pgs.
Chinese 5th Office Action in Application 200510127998.2, dated Mar. 2, 2012, 8 pgs.
Chinese Notice of Allowance in Application 2005101279978.2, dated Dec. 5, 2011, 4 pgs.
Chinese Notice of Allowance in Application 200510127998.2, dated Aug. 20, 2012, 4 pgs.
Chinese Notice of Allowance in Application 201110329007.4, dated Jul. 1, 2015, 6 pgs.
Chinese Notice of Allowance in Application 201110462797.3, dated Mar. 3, 2015, 4 pgs.
Chinese Notice of Entering into Substantive Examination in Application 201210331041.X, dated Mar. 6, 2013, 3 pgs.
Chinese Office Action dated Apr. 29, 2010 in Application No. 200510127997.8, 16 pgs.
Chinese Office Action dated Apr. 29, 2010 in Application No. 200510127998.2, 10 pgs.
Chinese Second Office Action dated Mar. 3, 2011 in Application No. 200510127998.2, 8 pgs.
Chinese Second Office Action dated Mar. 30, 2011 in Application No. 200510127997.8, 26 pgs.
Chinese Third Office Action dated Jul. 7, 2011 in Application No. 200510127998.2, 9 pgs.
CIFS http://msdn.microsoft.com/library/en-us/cifs/protocol/cifs.asp?frame=true, obtained online Oct. 23, 2006, obtained online Oct. 23, 2006, 2 pgs.
CIFS Oplock File Locking, MSDN, [Retrieved Jan. 7, 2008], Retrieved from: http://msdn2.microsoft.com/en-us/library/aa302210.aspx; 3 pgs.
CIFS or Public SMB Information on Common Internet File System http://support.microsoft.com/default.aspx ?scid=kb;en-us;199072; obtained online Oct. 23, 2006, 2 pgs.
Defense Advanced Research Projects Agency, by Information Sciences Institute Univ. of So. CA., "Internet Protocol—DARPA Internet Program Protocol Specification"; Available at: https://www.rfc-editor.org/rfc/rfc791.txt, Sep. 1, 1981, 52 pgs.
Dehaese, G., The ISO 9660 File System [online], May 1995, [Retrieved Sep. 14, 2007], Retrieved from: http://users.pandora.be/it3.consultants.bvba/handouts/ISO9960.html.
Digital Equipment Corporation, Introduction to RSX-11M [online, Order No. AA-L763B-TC, RSX-11M Version 4.2, First Printing Sep. 1979, Revised Nov. 1981 and Jul. 1985, [Retrieved Aug. 9, 2007], Retrieved from: http://www.computer.museum.uq.edu.au/RSX-11%20Manuals.html; 65 pgs.
Digital Equipment Corporation, RSX-11M/M-Plus RMS-11 User's Guide [online], Order No. AA-L669A-TC, Apr. 1983, [Retrieved Aug. 17, 2007], Retrieved from: http://www.computer.museum.uq.edu.au/RSX-11%20Manuals.html; 186 pgs.
ECMA, Volume and File Structure for Write-Once and Rewritable Media using Non-Sequential Recording for Information Interchange 3rd Edition [online], ECMA-167, Jun. 1997, [Retrieved Aug. 9, 2007, Retrieved from: http://www.ecma-international.org/publications/files/ECMA-ST/Ecma-167.pdf; 150 pgs.
European Communication and partial Search Report in Application 12830847.5, dated Mar. 18, 2015, 6 pgs.
European Communication in Application 11846483.3, dated Jan. 12, 2015, 1 page.
European Communication in Application 12804233.0, dated Jul. 31, 2015, 1 page.

(56) References Cited

OTHER PUBLICATIONS

European Communication in Application 12805065.5, dated Jun. 18, 2015, 1 page.
European Communication in Application 12829430.3, dated Mar. 3, 2015, 1 page.
European Communication in Application 12830847.5, dated Jul. 24, 2015, 1 page.
European Exam Report in Application 05111885.9 dated Sep. 13, 2007, 5 pgs.
European extended Search Report in Application 12804233.0, dated Jul. 15, 2015, 18 pgs.
European Extended Search Report in Application 12829430.3, dated Feb. 12, 2015, 6 pgs.
European extended Search Report in Application 12830847.5, dated Jul. 7, 2015, 11 pgs.
European Intention to Grant in Application 10013021.0, dated Jan. 28, 2014, 7 pgs.
European Invitation to Correct Defects in Application No. 08008916.2 dated Sep. 4, 2008, 6 pgs.
European Notice of Allowance in Application 05111885.9 dated Jun. 11, 2008, 6 pgs.
European Notice of Allowance in Application 080089162 dated Jan. 24, 2011, 6 pgs.
European Notice of Allowance in Application 11846483.3, dated Aug. 11, 2015, 7 pgs.
European Notice to Grant in Application 05111885.9 dated Oct. 9, 2008, 1 page.
European Office Action in Application 12829430.3, dated Oct. 6, 2015, 4 pgs.
European Partial Search Report in Application 12804233.0, dated May 7, 2015, 7 pgs.
European Search Report dated Feb. 1, 2011 in Application No. 10013021.0, 9 pgs.
European Search Report dated Feb. 15, 2006 in Application No. 05111729.9, 193 pgs.
European Search Report dated Feb. 22, 2006 in Application No. 05111729.9, 8 pgs.
European Search Report dated Jan. 20, 2006 in Application No. RS113279/US18298905, 2 pgs.
European Search Report dated Jan. 20, 2006 in Application No. RS113280/US18225105, 4 pgs.
European Search Report dated Jan. 4, 2011 in Application No. 10012923.8, 9 pgs.
European Search Report dated Jun. 18, 2008 in Application No. 08008916.2, 9 pgs.
European Search Report dated Sep. 19, 2006 in Application No. 055111885.9, 8 pgs.
European Search Report in Application 12805065.5, dated Jun. 1, 2015, 9 pgs.
European Supplementary Search Report in Application 11846483.3, dated Dec. 16, 2014, 10 pgs.
French, Steven M., "A New Network File System is Born: Comparison of SMB2, CIFS, and NFS", retrieved Mar. 23, 2011, 14 pgs.
Gifford et al., *The Cedar File System*, Communications of the ACM, vol. 31, No. 3, Mar. 1998; 11 pgs.
Greenberg et al., "NFILE—A File Access Protocol"; Network Working Group; RFC 1037; Dec. 1997; 43 pgs.
Gu et al., "SABUL: A High Performance Data Transfer Protocol"; IEEE Communications Letters; 2001; 11 pgs.
Hartman; "The Zebra Striped Network File System"; Doctoral dissertation at the University of California at Berkeley; 1991; 159 pgs.
Hertel, Implementing CIFS The Common Internet File System [online], [Retrieved Jul. 13, 2007], Retrieved from: http://ubiqx.org/cifs/; 3 pgs.
Hiltunen et al., "Implementing Integrated Fine-Grain Customizable QoS Using Cactus"; The 29th Annual International Symposium on Fault-Tolerant Computing (Fast Abstract); Madison, WI; 1999, 2 pgs.

Hitz et al., File System Design for an NFS File Server Appliance [online], Network Appliance, TR 3002, 1994, [Retrieved Aug. 9, 2007], Retrieved from: http://www.netapp.com/library/tr/3002.pdf; 13 pgs.
Hobbit, CIFS: Common Insecurities Fail Scrutiny [online], Avian Research, Jan. 1997, Retrieved from: http://web.textfiles.com/hacking/cifs.txt; 39 pgs.
Hong Kong Certificate of Grant in Application 07105689.8 dated Jun. 26, 2009, 2 pgs.
IBM, IBM Personal Computer Seminar Proceedings, vol. 2, No. 5, Sep. 1984; 13 pgs.
Indian First Exam Report in Application 3305/DE/L2005, dated Mar. 28, 2013, 2 pgs.
Indian Office Action in Patent Application No. 3306/DEL/2005, dated Aug. 10, 2015, 2 pages.
International Organization for Standardization, Banking—Approved algorithms for message authentication—, ISO 8731-1, Jun. 1, 1987; 4 pgs.
Internet Assigned Numbers Authority, Well-Known Port Numbers, http://www.jana.org/assignments/port-numbers, obtained online on Oct. 5, 2006, 233 pgs.
Japanese Office Action in Application 200510127997.8 dated Aug. 3, 2011, 8 pgs.
Japanese Office Notice of Allowance in Application 2006-307121 dated Feb. 14, 2012, 6 pgs.
Japanese Office Notice of Rejection in Application 2006-307121 dated Aug. 12, 2011, 5 pgs.
Japanese Office Notice of Rejection dated Apr. 3, 2007 in Application No. 2005-356145, 6 pgs.
Japanese Office Notice of Rejection dated Jan. 15, 2008 in Application No. 2005-356145, 5 pgs.
Japanese Office Notice of Rejection dated Mar. 10, 2006 in Application No. 2005-356146, 5 pgs.
Japanese Office Notice of Rejection dated May 12, 2006 in Application No. 2005-356145, 4 pgs.
Japanese Office Notice of Rejection dated Nov. 10, 2006 in Application No. 2005-356146, 3 pgs.
John H. Samba Team Terpstra, "Chapter 32. High Availability Part III. Advanced Configuration", retrieved Mar. 22, 2011, 6 pages.
Kent et al., IP Authentication Header [online], RFC 2402, Nov. 1998, [Retrieved Aug. 9, 2007], Retrieved from: http://tools.ietf.org/html/rfc2402, 20 pgs.
Kent et al., Security Architecture for the Internet Protocol [online], RFC 2401, Nov. 1998, [Retrieved Jun. 6, 2007], Retrieved from: http://www.ietf.rg/rfc/rfc2401.txt? number=2401, 62 pgs.
Klima, "Tunnels in Hash Functions: MD5 Collisions Within a Minute", Version 1, Mar. 2006, Version 2 Apr. 2006, Cryptology ePrint Archive, 17 pgs.
Korean Notice of Preliminary Rejection dated Jan. 21, 2011, Application No. 2007-0080691, 4 pgs.
Korean Notice of Rejection dated Nov. 17, 2006 in Application No. 10-2005-0124340, 5 pgs.
Krawczyk, "HMAC: Keyed-Hashing for Message Authentication", RFC-2104, Feb. 1997, http://www.jetf.org/rfc/rfc2104.txt, 10 pgs.
Leach et al., CIFS Logon and Pass Through Authentication Preliminary Draft [online], Jan. 3, 1997, 22 pgs.
Leach et al., CIFS/E Browser Protocol Preliminary Draft [online], Jan. 10, 1997, 33 pgs.
Leach et al., draft-leach-cifs-print-spec-00.txt, CFIS Printing Specification Preliminary Draft [online], Jan. 31, 1997; 30 pgs.
Leach et al., draft-leach-cifs-rap-spec-00.txt, CFIS Remote Administration Protocol Preliminary Draft [online], Feb. 26, 1997; 39 pgs.
Leach, P. et a., "A Common Internet File System (CIFS/1.0) Protocol Preliminary Draft", draft-leach-cifs-v1-spec-02, Mar. 13, 1997, http://microsoft.com/mscorp/ip/protocols/BSTD/CIFS; 160 pgs.
Leach, P., Naik, D., A Common Internet File System (CIFS/1.0) Protocol Preliminary Draft [online], Dec. 19, 1997. Retrieved from: http://tools.ietf.org/html/draft-leach-cifs-v1-spec-01; 132 pgs.
LeGrow, "Maintenance—MSRPC Update (Version 11) and SMB Update (Version 3)"; cfr-users mailing list; http://list.nfr.com/mailman/listingfo/nfr-users; May 20, 2004; 2 pgs.

(56) References Cited

OTHER PUBLICATIONS

Linn, "Generic Security Service Application Program Interface, Version 2, Update 1", RFC 2743, Jan. 2000, http://www.ieft.org/rfc/rfc2743.txt, 90 pgs.

Loafman, Zach, "SMB1/SMB2; A BSD Perspective", retrieved Mar. 22, 2011, 35 pgs.

Maiworm, Daniel, "Symantec Enterprise Vault", Retrieved at http://www.cstl.com/products/Symantec/Symantec- Enterprise_Vault/FileSystem Archiving.pdf, Feb. 5, 2007, pp. 35.

Microsoft Computer Dictionary, Microsoft Press, Fifth Edition, 2002, p. 486.

Morris, "Andrew: A Distributed Personal Computing Environment", Communications of the ACM, vol. 29, No. 3, Mar. 1986, New York, 20 pgs.

MS-SMB2—Preview: Server Message Block (SMB) Version 2 Protocol Specification, copyright 2010 Microsoft Corporation, 309 pgs.

Mullender, "A Distributed File Service Based on Optimistic Concurrency Control", Proceedings of the Tenth ACM Symposium on Operating Systems Principles, Dec. 1-4, 1985, Orcas Island, WA, 14 pgs.

Murphy, Origins and Development of TOPS-20 [online], © 1989, 1996, [Retrieved Aug. 9, 2007], Retrieved from: http://www.opost.com/dlm/tenex/hbook.html; 28 pgs.

National Bureau of Standards, *Computer Data Authentication*, Federal Information Processing Standards Publication 113, May 30, 1985; 9 pgs.

New Zealand Examination Report in Application 622122, dated Aug. 28, 2014, 2 pgs.

New Zealand Notice of Acceptance in Application 622122, dated Jan. 15, 2015, 1 page.

NTFS Design Goals and Features, Retrieved at http://wininternals.uw.hu/ch12lev1sec4.html, Retrieved Date: Oct. 11, 2010, pp. 9.

Oehme, et al., "IBM Scale out File Services: Reinventing network-attached storage", Retrieved at http://www-935.ibm.com/services/us/its/pdf/sofs-am-journal-final-07010B.pdf, vol. 52 No. 4/5 Jul./Sep. 200B, 10 Pages.

Pawlowski, Brian et al. "The NFS Version 4 Protocol", Proceedings of the 2nd International System Administration and Networking Conference (SANE 2000). vol. 2. No. 5. 2000, 20 pgs.

PCT International Search Report and Written Opinion in International Application PCT/US2011/063618, dated Jun. 28, 2012, 9 pgs.

PCT International Search Report and Written Opinion in International Application PCT/US2012/041049, dated Jan. 17, 2013, 12 pgs.

PCT International Search Report and Written Opinion in International Application PCT/US2012/041703, dated Feb. 14, 2013, 13 pgs.

PCT International Search Report and Written Opinion in International Application PCT/US2012/054038, dated Feb. 20, 2013, 10 pgs.

PCT International Search Report and Written Opinion in International Application PCT/US2012/054039, dated Feb. 27, 2013, 11 pgs.

Periasamy, Anand Babu, "Next-Gen Linux File Systems: Change Is the New Constant", retrieved Mar. 23, 2011, 4 pages.

Platform SDK: File Systems: Microsoft SMB Protocol and CIFS Protocol Overview http://msdn.microsoft.com/ library/default.asp?url=/library/ en-us/fileio/fs/ microsoft_smb_protocol_and_cifs_protocol_overview.asp; obtained online on Aug. 3, 2011, 1 pg.

Pranevich, "The Wonderful World of Linux 2.6"; 2005; 17 pgs.

Recio, R. et al., "A Remote Direct Memory Access Protocol Specification", Network Working Group Request for Comments: 5040, Available at: https://tools.ietf.org/html/rfc5040, Oct. 1, 2007, 66 pgs.

Rivest, "The MD5 Message-Digest-Algorithm", RFC 1321, Apr. 1992, http://www.jetf.org/rfc/rfc2104.txt, 19 pgs.

Rubin, F., *Message Authentication Using Quadratic Residues* [online], Jan. 31, 1995, [Retrieved Sep. 14, 2007], Retrieved from: http://www.mastersoftware.biz/crypt002.htm; 6 pgs.

Samba Team, *The Samba Team are pleased to announce Samba1. 9.18* [online], Jan. 7, 1998, [Retrieved Jan. 4, 2008], Retrieved from: http://de.samba.org/samba/history/samba1.9.18.html; 4 pgs.

Sapuntzakis, C. et al., Internet Draft: "TCP RDMA option"; Available at: draft-csapuntz-tcprdma-00.txt, Feb. 1, 2000, 20 pgs.

Satran et al. *Internet Small Computer Systems Interface (iSCSI)* [online], RFC 3720, Apr. 2004, [Retrieved Mar. 3, 2007], Retrieved from: http://www.ietf.org/rfc/rfc3720.txt?number=3720; 67 pgs.

Satyanaryanan et al, "Scalable, Secure and Highly Available Distributed File Access", May 1990, 12 pgs.

Schneier, B., *Applied Cryptography Protocols, Algorithm and Source Code in C Second Edition*, John Wiley & Sons, Inc., © 1996; 788 pgs.

Shepler, S. et al., "Network File System (NFS) Version 4 Protocol", Network Working Group, Request for Comments: 3530, Apr. 2003, 275 pgs.

Shepler, S. et al., "NFS Version 4 Protocol", RFC 3010, Proceedings on the 2nd International System Administration and Networking Conference (SANE2000), Dec. 2000, 212 pgs.

Shepler, S., *NFS Version 4 Design Considerations* [online], RFC 2624, Jun. 1999, [Retrieved Jan. 4, 2008], Retrieved from: http://tools.ietf.org/html/rfc2624; 22 pgs.

SMB: The Server Message Block Protocol [online], 1999, Retrieved from: http://ubiqx.org/cifs/SMB.html; 143 pgs.

SNIA, *Common Internet File System (CIFS) Technical Reference* [online], Mar. 1, 2002, Retrieved from: http://www.snia.org/tech_activities/CIFS/CIFS-TR-1p00_FINAL.pdf; 150 pgs.

Soules et al., *Metadata Efficiency in a Comprehensive Versioning File System*, May 2002; 33 pgs.

South African Notice of Allowance in Application 2014/01381, dated May 5, 2015, 1 page.

Srinivasan et al., Spritely NFS: Implementation and Performance of Cache-Consistency Protocols [online], May 1989, [Retrieved Jan. 4, 2008], Retrieved from: http://www.hpl.hp.com/techreports/Compaq-DEC/WRL-89-5.pdf; 35 pgs.

Szczerbina, "Novell's NetWare Core Protocol", Dr. Dobb's Journal, Nov. 1993, 17 pgs.

Talpey et al., "NFSv4 Session Extensions, draft-ietf-nfsv4-sess-01"; Internet Draft; The Internet Society; Feb. 2005; 70 pgs.

The Java CIFS Client Library [online], [Retrieved Jul. 13, 2007], Retrieved from: http://jcifs.samba.org/, 8 pgs.

The Open Group; Technical Standard; Protocols for X/Open PC Interworking: SMB, Version 2; http://www.opengroup.org/onlinepubs/9697999099/toc.pdf; retrieved on Sep. 1, 1992; 534 pgs.

Tichy, W., RCS—A System for Version Control [online], Jan. 3, 1991, [Retrieved Aug. 6, 2007], Retrieved from: http://www.cs.purdue.edu/homes/trinkle/RCS/rcs.ps; 20 pgs.

TOPS-20 [online], Wikipedia, [Retrieved Mar. 4, 2007], Retrieved from: http://en.wikipedia.org/wiki/TOPS-20; 4 pgs.

Tridgell, "Inside Microsoft Networking", Jun. 25, 1998, 6 pgs.

U.S. Official Action dated Feb. 2, 2010 cited in U.S. Appl. No. 11/182,989, 18 pgs.

U.S. Official Action dated Jan. 25, 2010 cited in U.S. Appl. No. 11/182,251, 20 pgs.

U.S. Official Action dated Jul. 23, 2010 cited in U.S. Appl. No. 11/182,989, 17 pgs.

U.S. Official Action dated Jul. 30, 2010 cited in U.S. Appl. No. 11/182,251, 23 pgs.

U.S. Official Action dated Mar. 13, 2009 cited in U.S. Appl. No. 11/182,251, 20 pgs.

U.S. Official Action dated May 14, 2009 cited in U.S. Appl. No. 11/182,989, 23 pgs.

U.S. Appl. No. 11/182,251, Amendment and Response filed Oct. 11, 2012, 2 pgs.

U.S. Appl. No. 11/182,251, Amendment and Response filed Nov. 26, 2008, 12 pgs.

U.S. Appl. No. 11/182,251, Amendment and Response filed Nov. 30, 2010, 17 pgs.

U.S. Appl. No. 11/182,251, Amendment and Response filed Nov. 4, 2011, 17 pgs.

U.S. Appl. No. 11/182,251, Amendment and Response filed Apr. 26, 2010, 17 pgs.

(56) References Cited

OTHER PUBLICATIONS

U.S. Appl. No. 11/182,251, Amendment and Response filed May 30, 2012, 14 pgs.
U.S. Appl. No. 11/182,251, Amendment and Response filed Jun. 15, 2009, 14 pgs.
U.S. Appl. No. 11/182,251, Amendment and Response filed Sep. 14, 2009, 7 pgs.
U.S. Appl. No. 11/182,251, Notice of Allowance dated Jul. 12, 2012, 8 pgs.
U.S. Appl. No. 11/182,251, Office Action dated Jan. 30, 2012, 24 pgs.
U.S. Appl. No. 11/182,251, Office Action dated Nov. 6, 2008, 4 pgs.
U.S. Appl. No. 11/182,251, Office Action dated Aug. 22, 2008, 7 pgs.
U.S. Appl. No. 11/182,251, Office Action dated Aug. 4, 2011, 23 pgs.
U.S. Appl. No. 12/964,749, Amendment and Response filed Apr. 29, 2013, 9 pgs.
U.S. Appl. No. 12/964,749, Amendment and Response filed Aug. 23, 2013, 8 pgs.
U.S. Appl. No. 12/964,749, Notice of Allowance dated Nov. 15, 2013, 2 pgs.
U.S. Appl. No. 12/964,749, Notice of Allowance dated Sep. 5, 2013, 11 pgs.
U.S. Appl. No. 12/964,749, Office Action dated Jan. 29, 2013, 17 pgs.
U.S. Appl. No. 12/964,749, Office Action dated May 23, 2013, 13 pgs.
U.S. Appl. No. 13/172,757, Amendment and Response filed Mar. 6, 2014, 16 pgs.
U.S. Appl. No. 13/172,757, Amendment and Response filed Jul. 10, 2015, 17 pgs.
U.S. Appl. No. 13/172,757, Amendment and Response filed Aug. 19, 2013, 14 pgs.
U.S. Appl. No. 13/172,757, Office Action dated Dec. 6, 2013, 27 pgs.
U.S. Appl. No. 13/172,757, Office Action dated Apr. 10, 2015, 34 pgs.
U.S. Appl. No. 13/172,757, Office Action dated Apr. 19, 2013, 23 pgs.
U.S. Appl. No. 13/174,271, Amendment and Response filed Apr. 10, 2014, 10 pgs.
U.S. Appl. No. 13/174,271, Notice of Allowance dated May 29, 2014, 10 pgs.
U.S. Appl. No. 13/174,271, Notice of Allowance dated Aug. 8, 2014, 2 pgs.
U.S. Appl. No. 13/174,271, Office Action dated Jan. 10, 2014, 17 pgs.
U.S. Appl. No. 13/174,271, Supplemental Notice of Allowance dated Sep. 8, 2014, 2 pgs.
U.S. Appl. No. 13/228,732, Amendment after Allowance filed Jun. 4, 2014, 7 pgs.
U.S. Appl. No. 13/228,732, Amendment and Response filed Nov. 8, 2013, 15 pgs.
U.S. Appl. No. 13/228,732, Notice of Allowance dated Mar. 4, 2014, 17 pgs.
U.S. Appl. No. 13/228,732, Office Action dated Jul. 8, 2013, 16 pgs.
U.S. Appl. No. 13/228,732, USPTO response to Amendment after Allowance dated Jun. 27, 2014, 2 pgs.
U.S. Appl. No. 13/228,818, Amendment and Response filed Oct. 18, 2013, 24 pgs.
U.S. Appl. No. 13/228,818, Amendment and Response filed Nov. 17, 2014, 14 pgs.
U.S. Appl. No. 13/228,818, Amendment and Response filed Nov. 25, 2013, 28 pgs.
U.S. Appl. No. 13/228,818, Amendment and Response filed Jun. 16, 2014, 15 pgs.
U.S. Appl. No. 13/228,818, Office Action dated Mar. 14, 2014, 18 pgs.
U.S. Appl. No. 13/228,818, Office Action dated Mar. 25, 2015, 18 pgs.
U.S. Appl. No. 13/228,818, Office Action dated Jul. 18, 2013, 18 pgs.
U.S. Appl. No. 13/228,818, Office Action dated Aug. 15, 2014, 17 pgs.
U.S. Appl. No. 13/663,827, Advisory Action dated Aug. 22, 2013, 3 pgs.
U.S. Appl. No. 13/663,827, Amendment and Response filed Apr. 29, 2013, 10 pgs.
U.S. Appl. No. 13/663,827, Amendment and Response filed Aug. 6, 2013, 7 pgs.
U.S. Appl. No. 13/663,827, Amendment and Response filed Sep. 9, 2013, 8 pgs.
U.S. Appl. No. 13/663,827, Notice of Allowance dated Jan. 13, 2014, 10 pgs.
U.S. Appl. No. 13/663,827, Notice of Allowance dated Apr. 25, 2014, 10 pgs.
U.S. Appl. No. 13/663,827, Notice of Allowance dated Sep. 26, 2013, 11 pgs.
U.S. Appl. No. 13/663,827, Office Action dated Jan. 29, 2013, 16 pgs.
U.S. Appl. No. 13/663,827, Office Action dated May 7, 2013, 16 pgs.
U.S. Appl. No. 13/664,012, Amendment and Response filed Mar. 19, 2014, 7 pgs.
U.S. Appl. No. 13/664,012, Amendment and Response filed Apr. 24, 2013, 10 pgs.
U.S. Appl. No. 13/664,012, Amendment and Response filed Jul. 30, 2013, 12 pgs.
U.S. Appl. No. 13/664,012, Notice of Allowance dated Dec. 24, 2013, 11 pgs.
U.S. Appl. No. 13/664,012, Notice of Allowance dated May 20, 2014, 13 pgs.
U.S. Appl. No. 13/664,012, Notice of Allowance dated Sep. 12, 2013, 14 pgs.
U.S. Appl. No. 13/664,012, Office Action dated Jan. 25, 2013, 19 pgs.
U.S. Appl. No. 13/664,012, Office Action dated Apr. 30, 2013, 16 pgs.
U.S. Appl. No. 13/946,550, Office Action dated Sep. 23, 2015, 24 pgs.
U.S. Appl. No. 14/473,488, Notice of Allowance dated Jan. 26, 2015, 15 pgs.
U.S. Appl. No. 14/473,488, Notice of Allowance dated Feb. 12, 2015, 5 pgs.
U.S. Appl. No. 14/473,488, Notice of Allowance dated Apr. 16, 2015, 2 pgs.
U.S. Appl. No. 14/475,081, Office Action dated Aug. 18, 2015, 17 pgs.
U.S. Appl. No. 14/720,083, Office Action dated Jul. 1, 2015, 28 pgs.
U.S. Appl. No. 11/182,989, Amendment and Response filed Dec. 1, 2011, 13 pgs.
U.S. Appl. No. 11/182,989, Amendment and Response filed May 29, 2012, 11 pgs.
U.S. Appl. No. 11/182,989, Amendment and Response dated Oct. 19, 2009, 6 pgs.
U.S. Appl. No. 11/182,989, Amendment and Response dated Oct. 29, 2010, 14 pgs.
U.S. Appl. No. 11/182,989, Amendment and Response dated Nov. 26, 2008, 12 pgs.
U.S. Appl. No. 11/182,989, Amendment and Response dated May 3, 2010, 14 pgs.
U.S. Appl. No. 11/182,989, Amendment and Response dated Aug. 14, 2009, 11 pgs.
U.S. Appl. No. 11/182,989, Notice of Allowance dated Jun. 21, 2012, 5 pgs.
U.S. Appl. No. 11/182,989, Office Action dated Feb. 28, 2012, 20 pgs.
U.S. Appl. No. 11/182,989, Office Action dated Sep. 1, 2011, 19 pgs.
U.S. Appl. No. 11/182,989, Office Action dated Sep. 5, 2008, 6 pgs.
Vanwasi, "Unleashing the power of P2P"; Network Magazine India; Apr. 2002; 5 pgs.

(56) References Cited

OTHER PUBLICATIONS

Zhu, "The Simple and Protected Generic Security Service Application Program Interface (GSS-API) Negotiation Mechanism", RFC-4178, Oct. 2005, http://www.ietf.org/rfc/rfc4178.txt, 20 pgs.
U.S. Appl. No. 14/475,081, Amendment and Response filed Nov. 18, 2015, 14 pgs.
U.S. Appl. No. 13/172,757, Notice of Allowance dated Nov. 12, 2015, 11 pgs.
Japanese Office Action in Application 2013-543293, dated Nov. 4, 2015, 15 pgs.
Chinese Office Action in Application 201280032570.8, dated Dec. 11, 2015, 15 pgs.
Chinese Notice of Allowance in Application 201210434813.2, dated Oct. 10, 2015, 4 pgs.
U.S. Appl. No. 14/720,083, Amendment and Response filed Sep. 16, 2015, 12 pgs.
Australian Office Action in Application 2012275906, dated Jan. 11, 2016, 3 pgs.
Chinese 4th Office Action in Application 201210331041.X, dated Jan. 20, 2016, 10 pgs.
Chinese 3rd Office Action in Application 201210330725.8, dated Jan. 20, 2016, 11 pgs.
Israeli Communication in Application 231373, dated Dec. 28, 2015, 3 pgs.
Singapore Notice of Allowance and Supplemental Examination Report in Application 11201400442S , dated Jan. 26, 2016, 4 pgs.
U.S. Appl. No. 13/946,550, Amendment and Response filed Dec. 23, 2015, 10 pgs.
U.S. Appl. No. 14/720,083, Notice of Allowance dated Dec. 22, 2015, 8 pgs.
U.S. Appl. No. 14/720,083, Notice of Allowance dated Jan. 11, 2016, 2 pgs.
U.S. Appl. No. 14/475,081, Office Action dated Jan. 21, 2016, 18 pgs.
U.S. Appl. No. 13/172,757, Notice of Allowance dated Jan. 21, 2016, 2 pgs.
Chinese 2nd Office Action in Application 201280032558.7, dated Mar. 28, 2016, 6 pgs.
Australian Office Action in Application 2011338485, dated Mar. 18, 2016, 2 pgs.
Russian Notice of Allowance in Application 2013126471, dated Feb. 29, 2016, 18 pgs.
European Notice of Allowance in Application 12804233.0, dated Apr. 7, 2016. 7 pgs.
Japanese office Action in Application 2014-518599, dated Apr. 14, 2016, 7 pgs.
Russian Notice of Allowance in Application 2013158710, dated Apr. 5, 2016, 16 pgs.
U.S. Appl. No. 14/475,081, Amendment and Response filed Apr. 21, 2016, 12 pgs.
U.S. Appl. No. 14/475,081, Notice of Allowance dated May 24, 2016, 5 pgs.
U.S. Appl. No. 13/172,757, Notice of Allowance dated Mar. 31, 2016, 2 pgs.
U.S. Appl. No. 13/946,550, Notice of Allowance dated Apr. 26, 2016, 12 pgs.
European Notice of Allowance in Application 05111729.9, dated Mar. 23, 2016, 7 pgs.
European Notice of Allowance in Application 10012923.8, dated Apr. 5, 2016, 7 pgs.
U.S. Appl. No. 14/720,083, Notice of Allowance dated Apr. 1, 2016, 2 pgs.
European Notice of Allowance in Application 12829430.3, dated Apr. 29, 2016, 7 pgs.
Russian Notice of Allowance in Application 2014108995, dated Apr. 1, 2016, 13 pgs.
Russian Notice of Allowance in Application 2014108994, dated Nov. 22, 2016, 16 pgs.
Japanese Office Action in Application 2014-529876, dated Dec. 28, 2016, 11 pgs.
Japanese Notice of Allowance Issued in Japanese Patent Application No. 2014-518588, dated Oct. 20, 2016, 4 Pages.
U.S. Appl. No. 14/475,081, Amendment after Allowance dated Aug. 24, 2016, 3 pgs.
U.S. Appl. No. 14/475,081, Notice of Allowance dated Aug. 24, 2016, 3 pgs.
Chinese Notice of Allowance in Application 201280032558.7, dated Aug. 3, 2016, 4 pgs.
Indian Exam Report in Application 3306/DEL/2005, dated Aug. 10, 2015, 2 pgs.
Japanese Office Action Issued in Patent Application No. 2014-518588, dated Apr. 21, 2016, 6 Pages.
Russian Office Action in Application 2014108994, dated Aug. 18, 2016, 5 pgs.
Australian Office Action in Application 2012304550, dated Sep. 2, 2016, 4 pgs.
European Extended Search Report in Application 16179836.8, dated Oct. 20, 2016, 9 pgs.
European Notice of Allowance in Application 12804233.0, dated Oct. 17, 2016, 7 pgs.
Australian Office Action in Application 2012304549, dated Nov. 18, 2016, 2 pgs.
European Notice of Allowance in Application 12829430.3, dated Sep. 22, 2016, 7 pgs.
Chinese Notice of Allowance in Application 201280032570.8, dated Mar. 2, 2017, 4 pgs.
Australia Notice of Allowance in Application 2012304550, dated Jan. 16, 2017, 3 pgs.
European Notice of Allowance in Application 12830847.5, dated Dec. 21, 2016, 7 pgs.
Japanese Notice of Allowance in Application 2013-543293, dated Apr. 4, 2017, 3 pgs. (No English translation).
European Notice of Allowance in Application 16159584.8, dated Mar. 24, 2017, 7 pgs.
Australian Notice of Allowance in Application 2012304549, dated Mar. 27, 2016, 4 pgs.
European Search Report in Application 17165513.7, dated Jun. 26, 2017, 8 pgs.
Australian Notice of Allowance in Application 2012275906, dated May 24, 2016, 2 pages.
Japanese Notice of Allowance in Application 2014518599, dated Jun. 17, 2016, 3 pages. (No English Translation.).
U.S. Appl. No. 14,475,081, Notice of Allowance dated Jun. 7, 2016, 2 pages.
Japanese Office Action in Application 2014-529876, dated May 24, 2016, 8 pages.
Isreal Office Action in Application 231373, dated Jun. 21, 2016, 2 pages.
U.S. Appl. No. 13/946,550, Notice of Allowance dated Jun. 3, 2016, 2 pages.
U.S. Appl. No. 13/946,550, Amendment and Response filed Jun. 28, 2016, 146 pgs.
U.S. Appl. No. 13/946,550, USPTO Response, dated Jul. 1, 2016, 2 pgs.
European Extended Search Report in Application 16159584.8, dated Jul. 5, 2016, 11 pgs.
Chinese Notice of Allowance in Application 201210330725.8, dated Jul. 13, 2016, 4 pgs.
U.S. Appl. No. 13/946,550, Notice of Allowance dated Aug. 3, 2016, 2 pgs.
Japanese Office Action in Application 2013-543293, dated Aug. 2, 2016, 12 pgs.
Japanese Office Action in Application 2014-529877, dated Jul. 19, 2016, 11 pgs.
Australian Office Action in Application 2012304549, dated Aug. 12, 2016, 3 pgs.
Australian Notice of Allowance in Application 2011338485, dated 7/11/201, 2 pgs.
Canadian Notice of Allowance in Application 2817620, dated Aug. 28, 2017, 1 page.
Japanese Office Action in Application 2016139400, dated Jul. 21, 2017, 9 pages.

(56) References Cited

OTHER PUBLICATIONS

Japanese Notice of Allowance in Application 2014529876, dated Aug. 14, 2017, 4 pgs.
Philippines Office Action in Application 1-2014-500504, dated Oct. 16, 2017, 2 pgs.
Japanese Office Action Issued in Japanese Patent Application No. 2016204949, dated Sep. 28, 2017, 11 Pages.
"Server Message Block (SMB) Version 2 Protocol Specification", Available at: https://web.archive.org/web/20100512200032/http://download.microsoft.com/download/a/e/6/ae6e4142-aa58-45c6-8dcf-a657e5900cd3/[MS-SMB2].pdf, Aug. 20, 2010, 341 Pages.
"Extended Search Report Issued in European Patent Application No. 05111885.9", dated Jan. 22, 2007, 8 Pages.
"Office Action Issued in Indonesian Patent Application No. P00201401364", dated Jul. 4, 2018, 4 Pages.
"Office Action Issued in Korean Patent Application No. 10-2007-0080691", dated Dec. 31, 2010, 4 Pages.
"Office Action Issued in Korean Patent Application No. 10-2011-0029927", dated May 30, 2011, 7 Pages.
"Office Action Issued in Korean Patent Application No. 10-2014-7006256", dated Jun. 14, 2018, 6 Pages.
"First Action Interview—Office action Issued in U.S. Appl. No. 11/182,989", dated Nov. 6, 2008, 10 Pages.
"Office Action Issued in Colombian Patent Application No. 1449366", dated Jun. 19, 2015, 21 Pages.
"Non Final Office Action Issued in U.S. Appl. No. 15/094,753", dated Apr. 6, 2018, 27 Pages.
"Second Office Action Issued in Chinese Patent Application No. 201280032570.8", dated Aug. 24, 2016, 8 Pages.
"Office Action Issued in Russian Patent Application No. 2013126471", dated Nov. 12, 2015, 6 Pages.
"Office Action Issued in South African Patent Application No. 2014/01381", dated Mar. 27, 2015, 1 Page.
"First Office Action and Search Report Issued in Chinese Patent Application No. 201610207685.6", dated Jul. 4, 2018, 12 Pages.
"Office Action Issued in Chilean Patent Application No. 539-2014", dated Jun. 11, 2015, 7 Pages.
"Office Action Issued in Chilean Patent Application No. 539-2014", dated Oct. 8, 2015, 6 Pages.
"Office Action Issued in Mexican Patent Application No. MX/a/2014/002782", dated Oct. 10, 2016, 4 Pages.
"Office Action Issued in Mexican Patent Application No. MX/a/2014/002782", dated Feb. 9, 2016, 4 Pages.
Office Action Issued in Korean Patent Application No. 10-2005-0124340, dated Oct. 5, 2007, 3 Pages.
"Office Action Issued in Indian Patent Application No. 3305/DEL/2005", dated Mar. 28, 2013, 2 Pages.
"Office Action Issued in Indian Patent Application No. 9850/CHENP/2013", dated Oct. 29, 2018, 6 Pages.
Korean Notice of Allowance Issued in Korean Patent Application No. 10-2014-7006137, dated Nov. 15, 2018, 5 Pages.
"Office Action Issued in European Patent Application No. 12805065.5", dated Sep. 4, 2019, 5 Pages.
"Office Action Issued in Korean Patent Application No. 10-2013-7034797", dated Jan. 21, 2019, 7 Pages.
"Office Action Issued in European Patent Application No. 17165513.7", dated Feb. 1, 2019, 6 Pages.
"Final Office Action Issued in Chinese Patent Application No. 201610207685.6", dated Feb. 3, 2019, 5 Pages.
"Office Action Issued in Chinese Patent Application No. 201610903829.1", dated Jan. 8, 2019, 12 Pages.
"Office Action Issued in Indian Patent Application No. 4006/CHENP/2013", dated Sep. 27, 2019, 7 Pages.
"Notice on Reexamination Issued in Chinese Patent Application No. 201610207685.6", dated Jan. 9, 2020 7 Pages.
"Examination Report Issued in Indian Patent Application No. 1686/CHENP/2014", dated Dec. 27, 2019, 7 Pages.
"Examination Report Issued in Indian Patent Application No. 1748/CHENP/2014", dated Dec. 30, 2019, 6 Pages.

* cited by examiner

SMB2 SCALEOUT

CROSS REFERENCE TO RELATED APPLICATIONS

This application is a division of U.S. patent application Ser. No. 13/228,818, filed on Sep. 9, 2011, entitled "SMB2 SCALEOUT," which is hereby incorporated by reference in its entirety.

BACKGROUND

Server clusters are commonly used to provide failover and high availability of information to clients. Traditionally, cluster environments are designed according to a client-server protocol in which a client connects to server in order to access resources available to the server. In traditional clustered environments, different servers that compose the environment may access different file systems. The inability to access a common file system restricts the functionality of a traditional file system cluster.

It is with respect to these and other considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Embodiments of the present disclosure provide a scaled out clustered environment where a files system may be logically clustered such that each node in the cluster has access to all resources that reside in the cluster. Because the file system is accessible to each node in the clustered environment, a client can access the cluster's resources regardless of which node the client connects to. Such an environment provides a client with options when connecting to the clustered environment. The client may leverage the flexibility of the scaled cluster node to efficiently connect to the server cluster.

In other embodiments, while the scaled clustered environment allows the clients to access resources across the cluster regardless of the actual node that the client establishes a connection with, once the client establishes a connection with a node it attempts to maintain its connection with the same node in order to reduce the amount of state information that is transferred between then nodes of the clustered environment.

However, in some instances a client may not be able to maintain a connection with the same node, but is required to connect to a different node in the scaled clustered environment. In further environments, the scaled cluster environment provides for the storage and maintenance of session information, state information, and or handle's in order to facilitate a client's movement from one node to another. The cluster's nodes are able to communicate such information between one another to facilitate the movement of client connections.

Embodiments may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1:
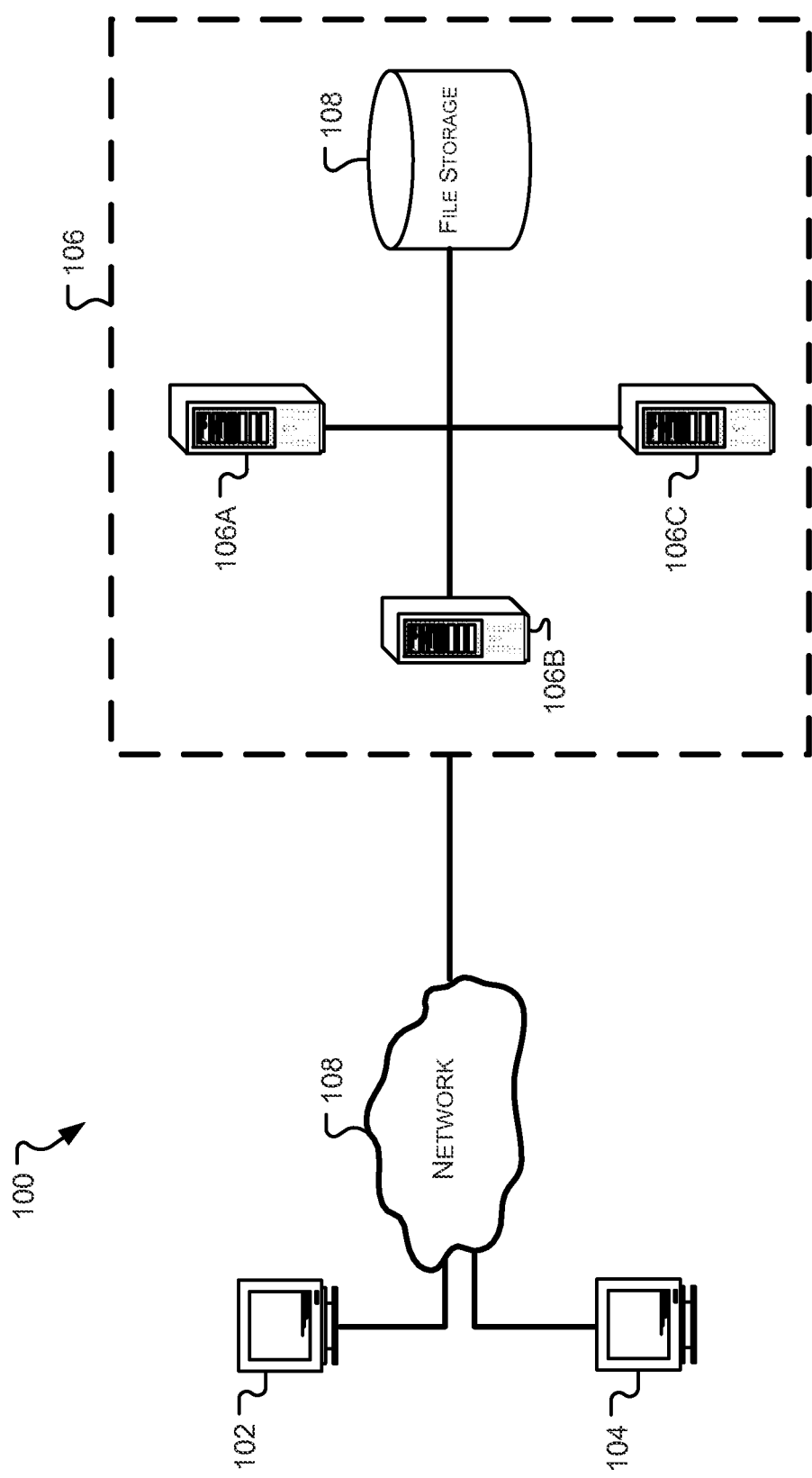
FIG. 1 illustrates a system that may be used to implement embodiments described herein.

FIG. 1 illustrates a system 100 that may be used to implement some of the embodiments disclosed herein. System 106 may be an example clustered system that contains one or more nodes. An example of a clustered system is a server cluster with one or more servers, as illustrated in FIG. 1. System 100 includes clients 102 and 104 and a server cluster 106. Clients 102 and 104 communicate with server cluster 106 through network 108. In embodiments, network 108 may be the Internet, a WAN, a LAN, or any other type of network known to the art. Server cluster 106 stores resources that are accessed by applications on clients 102 and 104. Clients 102 and 104 establish sessions with cluster 106 to access the resources on cluster 106. Although in FIG. 1 only clients 102 and 104 are shown as communicating with cluster 106, in other embodiments there may be more than two clients accessing information from server cluster 106. In embodiments, clients 102 and 104 may access or communicate with the server cluster 106 according to the SMB2 protocol.

As shown in FIG. 1 server cluster 106 includes one or more nodes, e.g., servers 106A, 106B, and 106C, which provide both high availability and redundancy for the information stored on cluster 106. The one or more nodes of server cluster 106 may communicate with each other via a network such as the Internet, a WAN, a LAN, or any other type of network known to the art. In embodiments, the cluster 106 may have a file system, a database, or other information that is accessed by clients 102 and 104. Although three servers are shown in FIG. 1, in other embodiments cluster 106 may include more than three servers, or fewer than three servers.

In embodiments, server cluster 106 is a scaled out server cluster. In embodiments, a scaled out server cluster includes a files system 108 that is accessible by each node in the server cluster (e.g., servers 106A, 106B, and 106C). As an example, in a scaled out cluster the file system is logically clustered such that the one or more disks that make up the file systems are visible from each server in the server cluster. In such embodiments, the scaled server cluster enables the sharing of resources across nodes in the cluster. In one such embodiment, the server cluster 106 includes a central data repository that includes one or more datastores that each server in server cluster 106 has access to. In such an embodiment, storing resources in the central repository allowing each server to access the file system. In another embodiment, a shared file system may be provided by replicating the resources across the local file systems of each server in the server cluster 106. In such embodiments, any manner of replicating data known to the art may be employed to replicate the cluster resources across the servers that make up the cluster.

The inclusion of a logically clustered file system in a scaled out server cluster, such as server cluster 106, provides additional functionality that is not available in a traditional server cluster. In one embodiment, the logically clustered file system ensures that each node that is part of the clustered environment can access any resource on the environment. In embodiments, a resource may be an application, a file, an object, data, or any other type of resource provided in a clustered environment. This allows a client to access and/or otherwise manipulate any resource on the file system regardless of which node (e.g., servers 106A, 106B, and/or 106C) the client establishes a connection to. In embodiments, file server 106 may register every node under a common name using a name resolution mechanic. A non-limiting example of a name resolution mechanic is the Domain Name System (DNS). For example, server cluster 106 may register servers 106A, 106B, and 106C under a common name in a DNS server (not shown in FIG. 1). The DNS server may be a part of the server cluster 106 or it may be external to server cluster 106.

When a client attempts to access a server in server cluster 106, the client may access the name resolution mechanics to obtain the address a server. For example, a client may contact a DNS server to obtain an address for a server in server cluster 106. Because the server system registered all servers under a common name, the DNS server may return a list of addresses for each server (e.g., servers 106A, 106B, and 106C) that make up server cluster 106. In embodiments, the address may be an IP address, a URL, a URI, or any other type of address known to the art. Because multiple addresses are returned, the client is provided with a choice of which server to connect to. In embodiments, the client may choose to connect to the first address in the list it receives from the server. In some instances, the client may have trouble connecting to the first server identified by the first address (e.g., server 106A). Because each server in server cluster 106 is capable of providing the client with similar functionality, the client may decide to connect to another server in server cluster 106. If the client is unable to successfully connect to the first server, after waiting a predetermined period of time, a client may issue one or more requests to connect to a subset of the addresses it received from the name resolution mechanic (e.g., server 106B and server 106C) and pick a connection that succeeds. The one or more requests may be made in parallel, in which case the client may connect to the first server with which a successful connection is established.

Although a specific ordering of the list of addresses was provided above (e.g., server 106A as the first listed address) one of skill in the art will appreciate that the list of addresses may be in any order. In embodiments, a round robin technique may be employed with by the name resolution mechanic, such as DNS round robin, may be leveraged to provide load balancing across the network. Because multiple clients (e.g., client 102 and 104) may simultaneously connect to server cluster 106, the round robin technique ensures that the first address provided to different clients changes. Thus, initial connection requests are spread across all nodes of the clustered environment. Furthermore, clients may randomly select the subset of addresses it issues additional correction request to after an unsuccessful attempt at connection with a first server, thereby providing an additional load balancing mechanism.

In embodiments, once a client is connected to a server in server cluster 106, the client may ensure that it remains connected to the same server. Although each server (e.g., servers 106A, 106B, and 106C) shares a logically clustered file system, the client's session state may be handled by the server it is connected to. Thus, in order to minimize state synchronization traffic across the servers, a client may ensure that it remains connected to the same server. For example, if client 102 is connected to server 106A, client 102 may attempt to ensure that all of its connections and resource usage (e.g., open files) are on server 106A. In such embodiments, if client 102 loses its connection to server 106A, it will attempt to reconnect to server 106A instead of servers 106B or 106C when it reconnects to server cluster 106, thereby reducing the need for transferring session state between different servers in server cluster 106. In embodiments, because a client attempts to reconnect to the same server upon losing a connection, the server may maintain the client's session state even after it loses communication with the client. For example, if client 102 loses connection with server 106A, server 106A may maintain the session state for client 102. When client 102 reestablishes its connection, the persistence of the session state allows the client 102 to reuse its session information (e.g., state information) upon reconnecting to server 106A.

However, in some circumstances, it may not be efficient or possible for the client to maintain its connection to a single server in server cluster 106. For example, a server node failure, lost connectivity to a given server, or an administrative action, such as, load balancing, patching of a server, or any other type of administrative action, may make it impossible for a client to reconnect to the same node. To facilitate the changing of nodes, server cluster 106 may support persistent handles to resources accessed by a client. The persistent handles allow client to resume handles it established on a first node when connecting to a second node. For example, if client 102 changes its initial connection from server 106A to server 106C, the handles used by client 102 on server 106A may be transferred to server 106C.

In embodiments, server cluster 106 may employ a persistent state store to provide persistent handles. An example persistent state store is a resume key manager that may be present in one or more nodes of server cluster 106. However, one of skill in the art will appreciate that any type of cache or datastore may be utilized by server cluster 106 to facilitate persistent handles. In one embodiment, server cluster 106 provides a centralized persistent state store. In such embodiments, a single node (e.g., server 106B) in server cluster 106 maintains the persistent state of open handles for a client session. In such embodiments, each time a client switches from one node to another (e.g., switching from server 106A to 106C), the ownership of the handles that are part of the clients session may be transferred between the nodes (e.g., ownership transferred from server 106A to server 106C) by employing a previous session invalidation logic, such as the invalidation techniques described in the commonly assigned co-pending U.S. patent application Ser. No. 13/228,732, entitled "Clustered Client Failover", filed on Sep. 9, 2011, which is hereby incorporated by reference in its entirety. In other embodiments, ownership of the handles may be transferred explicitly by the client on a handle by handle bases.

In another embodiment, the persistent state store may be a distributed state store. In such embodiments, the persistent state store may be distributed across the nodes of server cluster 106. In such embodiment, each node may store a persistent state store. A clusterwide state replication algorithm may be used to replicate state across the distributed state store. In such embodiments, server cluster 106 maintains state information in cases when a subset of nodes fails.

As discussed, each node of a scaled cluster is connected to a logically clustered file system. In order to avoid conflicts when multiple clients access the same resource, the server cluster 106 may perform distributed state resolution by providing the ability for one or more node (e.g., 106A, 106B, and/or 106C) to take oplocks or a lease on a resource. In embodiments, shared readers may be supported by using RH oplocks, which allow multiple readers to access the same file on multiple nodes of a cluster. In further embodiments, write locks may also be supported by server cluster 106.

As described herein, one of skill in the art will appreciate that a scaled server clusters provide additional functionality that is not available in a non-scaled server cluster. Although specific examples of the additional functionality have been provided with respect to FIG. 1, one of skill in the art will appreciate that these are non-limiting examples of the benefits and functionality provided by a scaled server cluster.

Figure 2:
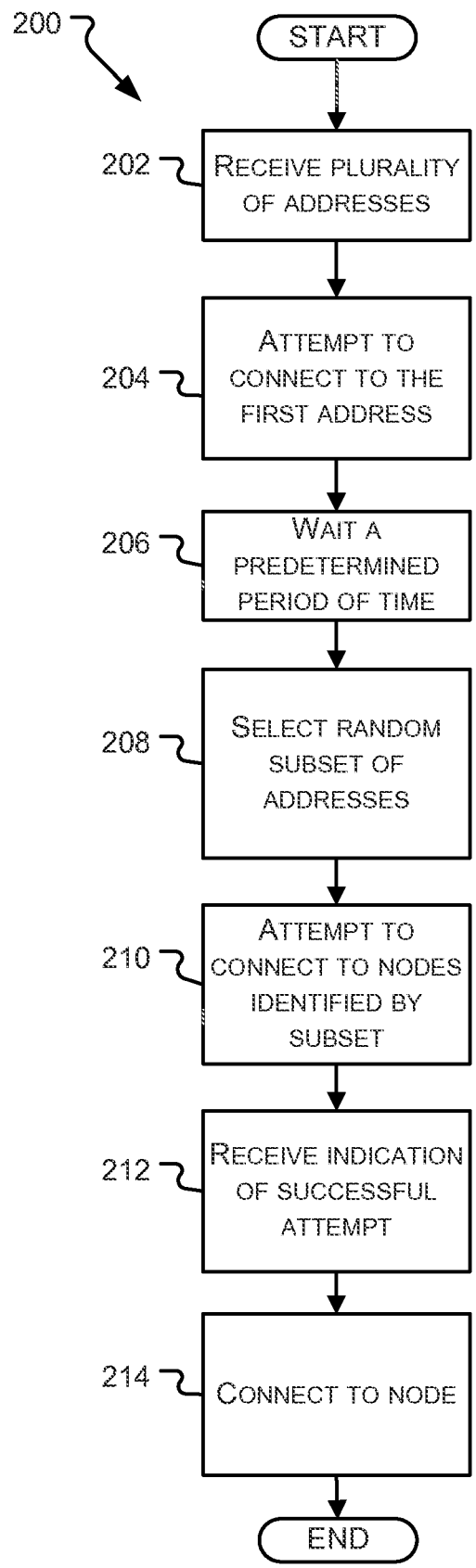
FIG. 2 is an embodiment of a method that a client may perform when connecting to a server cluster.

FIG. 2 is an embodiment of a method 200 that a client may perform when connecting to a clustered environment. For example, a client such as client 102 (FIG. 1) may employ method 200 to determine which node (e.g., 106A, 106B, and/or 106C) to establish a connection with when connecting to a clustered environment. Flow begins at operation 202 where the client receives a list of addresses from a name resolution mechanism, such as a DNS server. As discussed with respect to FIG. 1, in embodiments, each node in the clustered environment may be capable of providing similar functionality to the client. Thus, the client may successfully perform a desired operation or access a desired resource in the clustered environment regardless of which node the client connects to.

Flow continues to operation 204, where the client attempts to connect to a first node identified by a first address in the list of addresses received at operation 202. A client may attempt to connect to the first node by sending an initial connection request to the node identified by the first address at operation 204. However, one of skill in the art will appreciate that any manner of attempting a connection with a node (e.g., a server) at operation 203. In embodiments, the client may wait a predetermined period of time, as indicated by operation 206, for the first attempt to succeed. However, because any node in the clustered environment is capable of accessing any resource on the client's behalf, the client may issue attempt requests to other server clusters if the first attempt fails or is taking a long time. While operation 206 describes the client waiting a predetermined period of time, the time may also be dynamically determined by the client.

In another embodiment, the first attempt to connect to the server may be successful, however, the node may not have access to the resources of the clustered environment. For example, the list of addresses may contain an incorrect address or the address of a node that is no longer a part of the clustered environment. In a further embodiment, an error may prohibit the node from accessing the clustered environments resources. The client may employ logic necessary to identify such situations. In these situations, the client may treat the successful attempt as a failure and continue performing method 200.

Upon failure of the first attempt or after expiration of the period of time, flow continues to operation 208 where the client randomly selects a subset of addresses from the list of addresses. In embodiments, random selection of the subset addresses provides load balancing benefits to the clustered environment, which may have multiple clients attempting to connect to its nodes at a single time. If each client randomly selects a subset of nodes to connect to, a better balance of connections may be established across the clustered environment. In other embodiments, however, the client may not select a random subset but may select addresses in the order they appear on the list. In further embodiments, instead of selecting a subset of list of addresses at operation 208, the client may select all addresses in the list.

Flow continues to operation 210 where the client attempts to connect to one or more nodes identified by the addresses in the selected subset. In one embodiment, the client may attempt to connect to multiple nodes in parallel at operation 210, thereby speeding up the connection process. In embodiments, the client may send one or more additional connection requests different nodes at operation 210, however, as described with respect to operation 204, any manner of attempting to connect may be employed with the embodiments described herein.

Flow continues to operation 212, where the client receives an indication of a successful connection. In embodiments, the indication may be a message that the client receives from a node indicating that the client is able to connect to the node. In embodiments, if the client makes parallel attempts at operation 210, the client may decide to connect to the first node that successfully responds to the client at operation 212. In other embodiments, the client may receive multiple indications of successful attempts from different nodes in the clustered environment. In such embodiments, the client may choose which node to connect to. In further embodiments, the indications may provide performance about the node, such as the node's current load. The client may use such information to determine which node to establish a connection to. For example, the client may choose to connect to a node with a lighter load, a specific hardware configuration, etc. Once the client has selected a node, flow proceeds to operation 214 and the client connects to the node.

After the client connects to the node, the client establishes a session with the node and is capable of accessing resources in the clustered environment. As described with respect to FIG. 1, once a client establishes a connection to a node, the client attempts to maintain its connection with the same node. This reduces the transmittal of state information that may take place when a client transfers connections from one node to another. In such embodiments, if the client disconnects from the node, for example, due to an error such as a network failure or the client crashing, the client may attempt to reconnect to the same node after recovering from the error.

Figure 3:
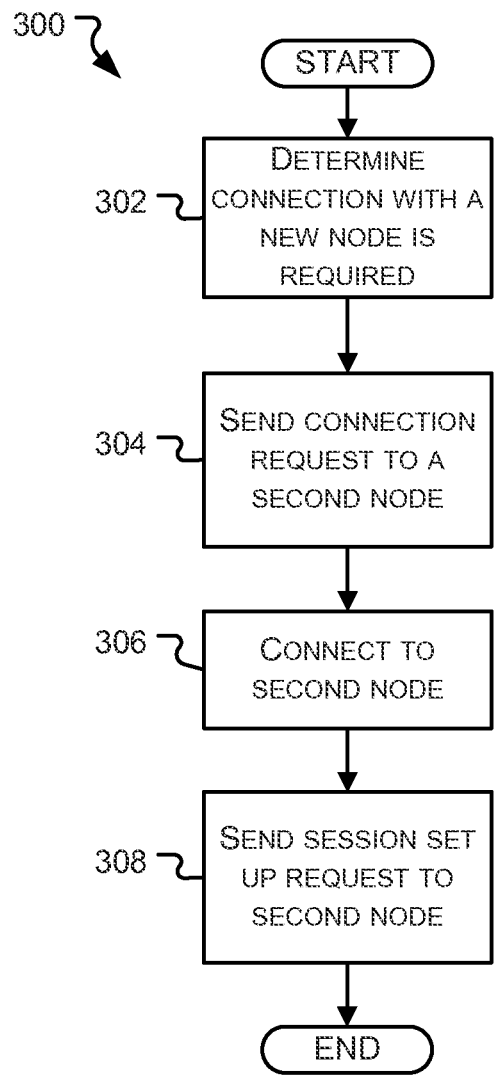
FIG. 3 is an embodiment of a method that a client may perform when transferring connections between nodes in a clustered environment.

However, it may not always be possible for the client to reconnect to the same node. For example, if the node fails, if a client loses connectivity with the node, or if the node is unavailable for an administrative purpose (e.g., due to load balancing requirements, patching of the node, etc.) the client may reestablish its connection to the clustered environment via a different node. FIG. 3 is an embodiment of a method 300 that a client may perform when transferring connections between nodes in a clustered environment.

Flow begins at operation 302 where the client determines that a connection with a new node is required. For example, upon losing connection with a node due to a network or node failure, the client may determine that it cannot reconnect to the same node in the clustered environment. In another embodiment, the client may receive performance information from the node. Based upon the performance information, the client may decide to transfer connection to another node that can provide better service to the client. For example, the client may receive information indicating that the node is experiencing heavy traffic. In such situations, the client may not be required to reconnect to another node, but may optionally decide to do so for performance reasons. Similarly, the client may determine this information on its own without receiving performance information from the node, for example, by monitoring how long it takes the node to perform a request.

In another embodiment, the node may require that the client transfer its connection to a different node in the cluster. For example, if the node is about to be brought offline for a patch or for load balancing purposes, the node may require the client to transfer its connection to a different node. In such embodiments, the node may transmit a message to the client that indicates the client must transfer its connection. Embodiments of performing such communications are described in the commonly assigned, commonly assigned copending patent application entitled "Providing a Witness Service" (U.S. patent application Ser. No. 13/074,920) filed on Mar. 29, 2011, which is hereby incorporated by reference in its entirety.

After determining that a transfer of connection between nodes is required, flow continues to operation 304. At operation 304, the client attempts to connect to a different node in the clustered environment. For example, the client may send a connection request to one or more nodes in the clustered environment. In embodiments, the client may connect to a second node in the clustered environment by performing all or a subset of the steps described with respect to method 200. In another embodiment, the client may be directed to connect to a specific node by the clustered environment. Upon a successful attempt, flow continues to operation 306 and the client connects to a second node in the clustered environment.

However, because the client had a previously established session, the session may be transferred to the different node. At operation 308, the client sends a session set up request to the second node. In embodiments, the session set up request may be a message containing a session identifier that identifies the clients previously established connection. As will be discussed further with respect to FIG. 5, in response to receiving the session set up request, the second node may take ownership of the previously established connection.

While the method 300 describes sending a session set up request as a discreet step, one of skill in the art will appreciate that a client may send a session set up request or a session identifier with a request to connect to the second node at operation 304.

Figure 4:
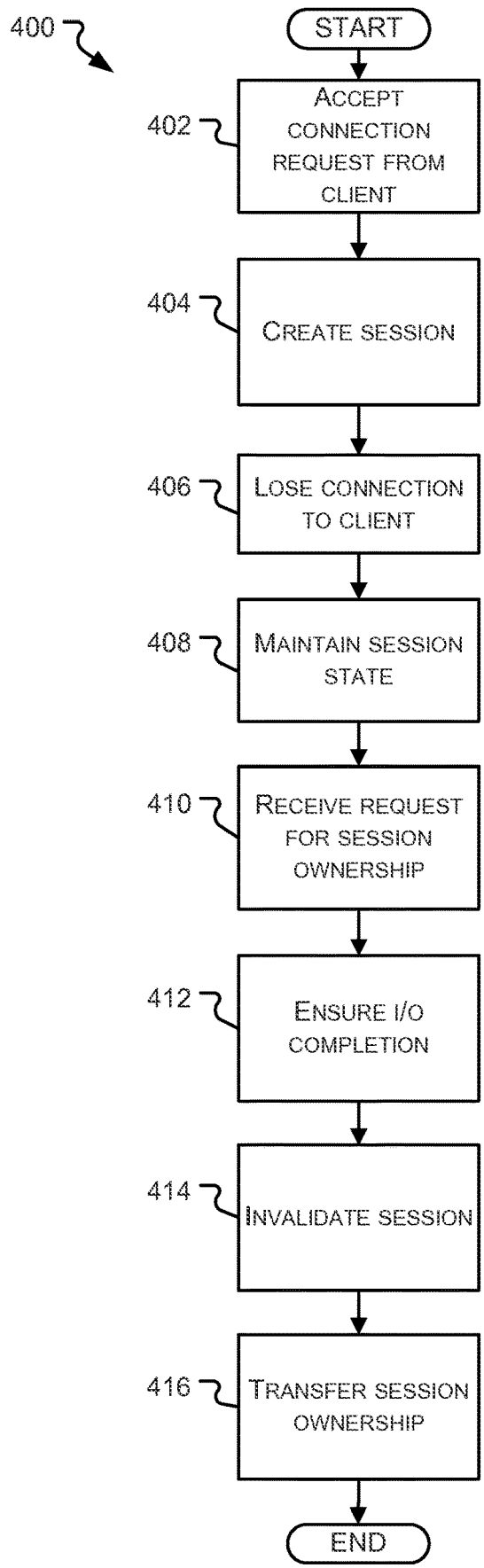
FIG. 4 is an embodiment of a method performed by a node in a clustered environment to maintain and transfer persistent handles.

Having now described methods that a client may employ when connecting to a scaled out clustered environment, the present disclosure will now describe the functionality that may be employed by one or more nodes in such an environment. FIG. 4 is an embodiment of a method 400 performed by a node in a clustered environment to maintain and transfer persistent handles in a clustered server environment. For example, the method 400 may be performed by a server, such as servers 106A, 106B, and 106C, which is part of a clustered server environment (e.g., server cluster 106). Flow begins at operation 402 where the accepts a connection request from a client thereby establishing a connection between the node and the client. The initial connection indicates that the client does not have a previously established on the node or on another node in the clustered environment. In embodiments, the node may determine that it is establishing a connection with the client when it does not receive a session set up request from the client as a part of the client's connection request or shortly after establishing the connection to the client.

Flow continues to operation 404 where the node creates a session with the client. At operation 404, the node may assign a session identifier to the session. The session identifier may be a globally unique identifier (GUID) across all nodes in the clustered environment. Upon creating the session, the node may allocate resources and/or perform operation on resources on the client's behalf In doing so, session information, such as, for example, state information, may be created. The node may store the session information. In addition to the state information, the node may store one or more handles. For example, if a client opens a file, a handle to the file may be provided to the client. The node may store handles along with, or in addition to, the session information.

Flow continues to operation 406 where the node loses its connectivity to the client. For example, the client may suffer an error (e.g., a crash or loss of network connection). In anticipation that the client may reconnect, the server will maintain the session and/or information at operation 408. For example, the node may write the session and/or state information to local memory, to a centralized persistent store, or to a distributed state store. As earlier described, a client will attempt to maintain a connection with a single node. In embodiments, after the client recovers from the error, the client may reconnect to the node. Upon reconnection, the node may identify that the client had a previously established state, for example, by receiving a session identifier from the client. In such embodiments, the maintained session state allows the client to continue its previously established session.

However, in certain circumstances, the client may not be able to reconnect to the node. Instead, the client may reconnect to a different node in the clustered environment. Under such circumstances, flow continues to operation 410 where the node receives a request to transfer session information from another node in the clustered environment. In embodiments, another node requests ownership of the session information in order to reestablish the session for the client, which is now connected to the node requesting ownership. The request for session ownership may include a session identifier that the node performing the method 400 may use to identify the previously established session that it owns and/or maintains.

Upon receiving the request for session ownership, flow continues to operation 412 where the node ensure that there are no outstanding input/output (I/O) operations being performed on resources associated with the previously established session. In embodiments, if there are outstanding I/O operations, the node waits for the operations to complete before proceeding to operation 414. In other embodiments, the node may cancel pending I/O operations on the session resources at operation 410. The node may wait for and/or cancel pending I/O operations maintains resource integrity.

After the node ensures that all I/O are completed (or cancelled), flow continues to operation 414. At operation 414, the node invalidates the previous established session. Invalidating the session may comprise closing any open handles that are a part of the session. In other embodiments, invalidating the session may include releasing any locks that may be on the resource. In embodiments, invalidation of the session may also include the invalidation logic described with respect to FIG. 1. Furthermore, in embodiments, single step invalidation may be performed in which the node invalidates all handles and/or locks for the previously established session to eliminate the need for the node to individually invalidate each file handles.

After the previously establish session is invalidated, flow continues to operation 416 where the node transfers ownership of the session to the requesting node. In embodiments, transfer of ownership of the session may include transferring ownership of all associated resources related to the session. An example resource that may be transferred at operation 416 is a file handle; however, the ownership of other resources may also be transferred at operation 416. In further embodiments, transferring ownership of the resources related to the session may include the transfer of the resource from one node to another. For the sake of efficiency, all session information may be transferred in bulk at operation 416, thereby reducing the number of communications required between the nodes.

Figure 5:
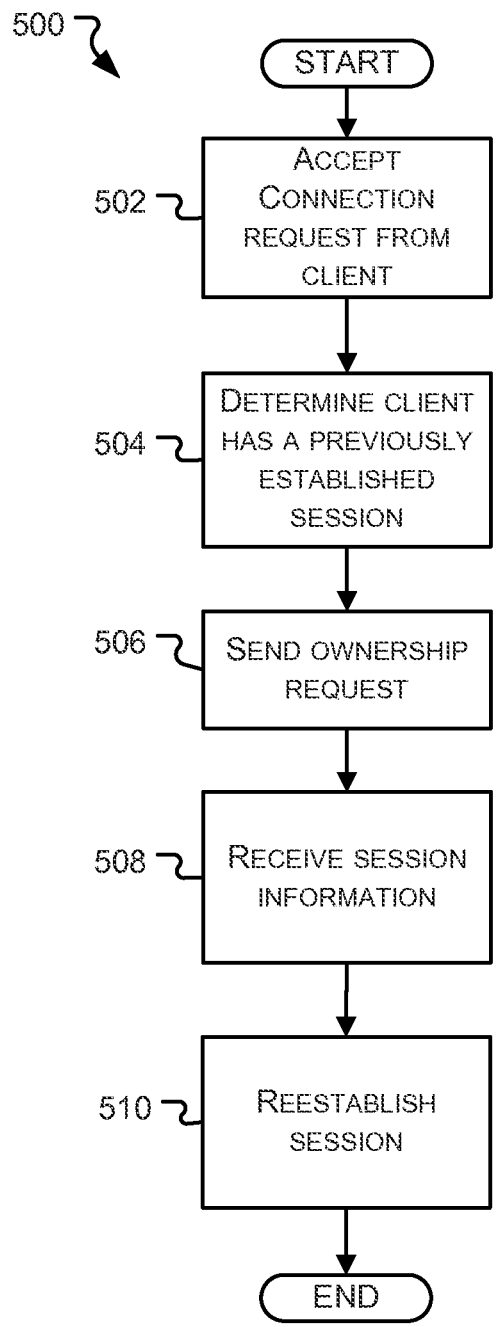
FIG. 5 is an embodiment of a method performed by a node in a clustered environment to request ownership of a previously established session.

FIG. 5 is an embodiment of a method 500 performed by a node in a clustered environment to request ownership of a previously established session. For example, the method 500 may be performed by a server, such as servers 106A, 106B, and 106C, which is part of a clustered server environment (e.g., server cluster 106). Flow begins at operation 502 where the node establishes a connection with a client. For example, the node may receive a request for a connection request from the client at operation 502. The node may accept the connection request and connect to the client.

Flow continues to operation 504 where the node identifies that the client previously established a session with another node in the clustered environment. In embodiments, the node may receive a session set up request from the client. The session set up request may be received with a connection request or after connecting to the client. In embodiments, the session set up request contains a session identifier that identifies the previously established connection.

Flow continues to operation 506 where the node sends an ownership request to a second node in the clustered environment that currently owns the client's previously established session. The ownership request may contain instructions to invalidate the handles associated with the previous session and transfer session information to the node. In embodiments, the ownership request may include a session set up request and/or a session id received at operation 504.

Flow continues to operation 508 where the node receives session and/or state information for the previously established session. In embodiments, the session and/or state information may be received from the second node, from a central repository, or from another location within the clustered environment. In another embodiment, rather than receiving the session and/or state information at operation 508, the node may be permitted to access session and/or state information that reside in a centralized repository at operation 508. Flow then continues to operation 510 where the node uses the received and/or accessed session or state information to reestablish the client's session and allow the client to continue accessing resources in the clustered environment.

Methods 300-500 are merely some examples of operational flows that may be performed in accordance with embodiments. Embodiments are not limited to the specific description provided above with respect to FIGS. 3-5 and may include additional operations. Further, operational steps depicted may be combined into other steps and/or rearranged. Further, fewer or additional steps may be used, employed with the methods described in FIGS. 3-5.

Figure 6:
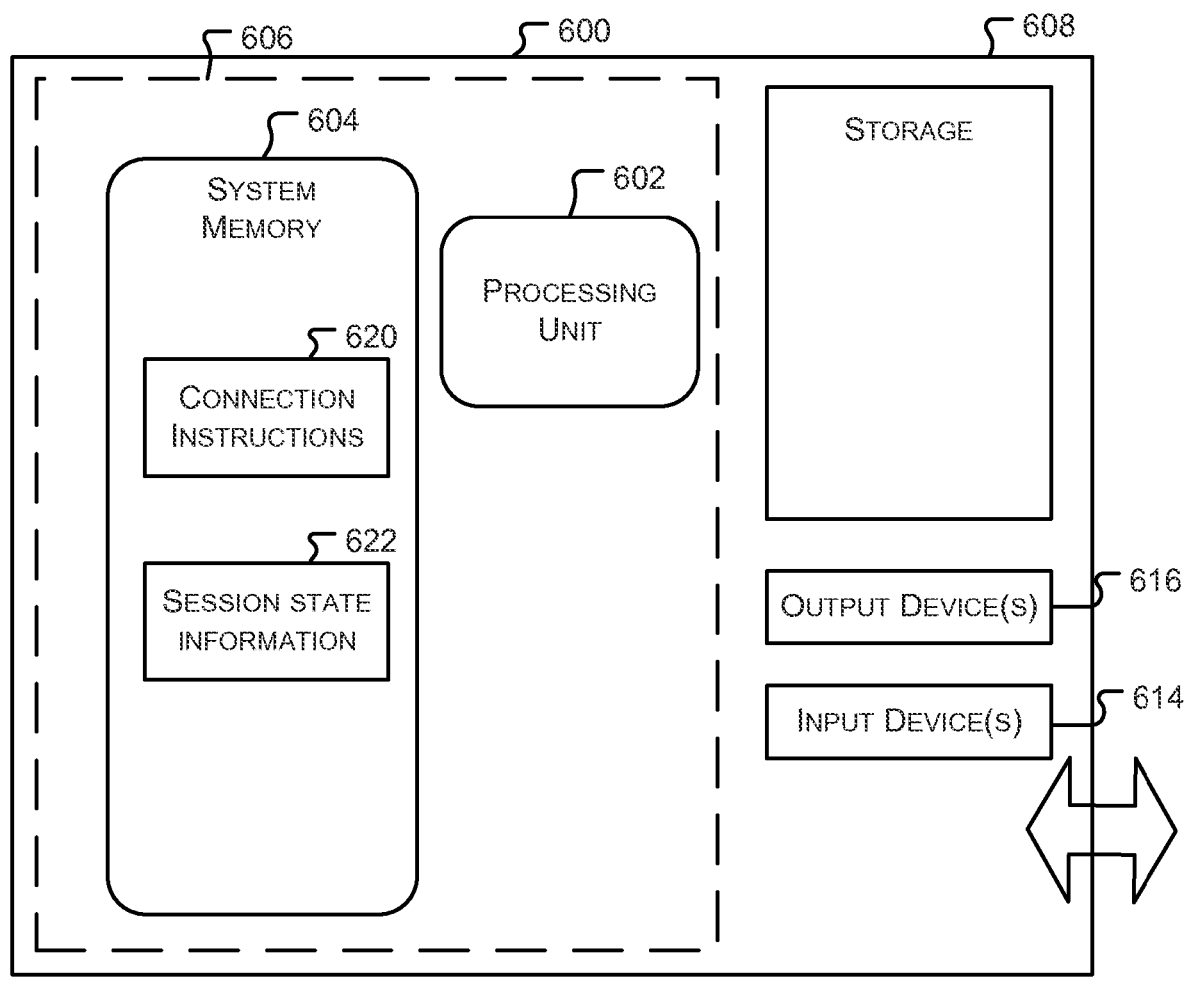
FIG. 6 illustrates a block diagram of a computing environment suitable for implementing embodiments.

FIG. 6 illustrates a general computer system 600, which can be used to implement the embodiments described herein. The computer system 600 is only one example of a computing environment and is not intended to suggest any limitation as to the scope of use or functionality of the computer and network architectures. Neither should the computer system 600 be interpreted as having any dependency or requirement relating to any one or combination of components illustrated in the example computer system 600. In embodiments, system 600 may be used as the clients and/or servers described above with respect to FIG. 1.

In its most basic configuration, system 600 typically includes at least one processing unit 602 and memory 604. Depending on the exact configuration and type of computing device, memory 604 may be volatile (such as RAM), non-volatile (such as ROM, flash memory, etc.) or some combination. This most basic configuration is illustrated in FIG. 6 by dashed line 606. System memory 604 stores instructions 620 such as the instructions to connect to a scaled cluster environment methods disclosed herein and data 622 such as session state information that may be stored in a file storage system with storage such as storage 608.

The term computer readable media as used herein may include computer storage media. Computer storage media may include volatile and nonvolatile, removable and non-removable media implemented in any method or technology for storage of information, such as computer readable instructions, data structures, program modules, or other data. System memory 604, removable storage, and non-removable storage 608 are all computer storage media examples (e.g. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 614 such as a keyboard, a mouse, a pen, a sound input device, a touch input device, etc. Output device(s) 616 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Embodiments of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing continuous access to a resource may operate via application-specific logic integrated with other components of the computing device/system 600 on the single integrated circuit (chip).

Reference has been made throughout this specification to "one embodiment" or "an embodiment," meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the embodiments are not limited to the precise configuration and resources described above. Various modifications, changes, and variations apparent to those skilled in the art may be made in the arrangement, operation, and details of the methods and systems disclosed herein without departing from the scope of the claimed embodiments.

We claim:

1. A computer system for providing persistent handles, the system comprising:
at least a first server and a second server, wherein the first sever and the second server are part of a server cluster;
the first server configured to:
receive a connection request from a client, wherein the connection request comprises a session setup request that identifies a previously established session with the second server;
in response to receiving the connection request from the client, send, to the second server, an ownership request of the previously established session, wherein the ownership request comprises the session setup request and a session ID associated with the previously established session; and the second server configured to:
receive the ownership request from the first server, wherein the ownership request comprises a session set up request;
in response to receiving the ownership request, ensuring that there are no pending operations on one or more resources associated with the previously established session; and
when there are no pending operations, invalidating the previously established session by at least closing one or more open handles associated with the previously established session.

2. The computer system of claim 1, wherein invalidating the session comprises at least one of:
closing at least one open handle associated with the previously established session; and
releasing at least one lock on the one or more resources associated with the previously established session.

3. The computer system of claim 2, wherein the second server is further configured to transfer ownership of the previously established session to the first server.

4. The computer system of claim 3, wherein transferring the previously established session comprises transferring ownership of the one or more resources associated with the previously established session to the first server.

5. The computer system of claim 3, wherein transferring the previously established session comprises transferring the one or more resources associated with the previously established session to the first server.

6. The computer system of claim 1, wherein ensuring that there are no pending operations comprises at least one of:
completing one or more pending operations; and
cancelling the one or more pending operations.

7. A method for transferring a previously established session in a server cluster environment, the method comprising:
receiving, at a first node in the server cluster, an ownership request from a second node in the server cluster to transfer a previously established session to the second node, wherein the ownership request comprises a session set up request, and wherein the first node conducted the previously established session with a client prior to losing a connection with the client;
in response to receiving the ownership request, determining whether there are pending operations for one or more resources associated with the previously established session; and
when there are no pending operations, invalidating the previously established session by at least closing one or more open handles associated with the previously established session.

8. The method of claim 7, wherein the request to transfer the previously established session comprises a session identifier, wherein the session identifier is used to identify the previously established session.

9. The method of claim 7, further comprising, when there are pending operations of the one or more resources associated with the previously established session, waiting for the pending operations to complete.

10. The method of claim 7, further comprising, when there are pending operations for the one or more resources associated with the previously established session, canceling the pending operations.

11. The method of claim 7, wherein invalidating the previously established session comprises at least one of:
closing at least one open handle associated with the previously established session; and releasing at least one lock on the one or more resources associated with the previously established session.

12. The method of claim 7, further comprising transferring ownership of the previously established session to the second node.

13. The method of claim 12, wherein transferring the previously established session comprises transferring ownership of the one or more resources associated with the previously established session to the second node.

14. The method of claim 12, wherein transferring the previously established session comprises transferring the one or more resources associated with the previously established session to the first node.

15. A computer storage device encoding computer-executable instructions that, when executed by at least one processor, perform a method comprising:
  receiving, at a first node in the server cluster, an ownership request from a second node in the server cluster to transfer a previously established session to the second node, wherein the ownership request comprises a session set up request and a session id associated with the previously established session, and wherein the first node conducted the previously established session with a client prior to losing a connection with the client;
  in response to receiving the ownership request, determining whether there are pending operations for one or more resources associated with the previously established session; and
  when there are no pending operations, invalidating the previously established session by at least closing one or more open handles associated with the previously established session.

16. The computer storage device of claim 15, wherein the request to transfer the previously established session comprises a session identifier, wherein the session identifier is used to identify the previously established session.

17. The computer storage device of claim 15, wherein invalidating the previously established session comprises at least one of:
  closing at least one open handle associated with the previously established session; and
  releasing at least one lock on the one or more resources associated with the previously established session.

18. The computer storage device of claim 15, wherein the method further comprises transferring ownership of the previously established session to the second node.

19. The computer storage device of claim 18, wherein transferring the previously established session comprises transferring ownership of the one or more resources associated with the previously established session to the second node.

20. The computer storage device of claim 18, wherein transferring the previously established session comprises transferring the one or more resources associated with the previously established session to the first node.

* * * * *